US011027383B2

(12) United States Patent
Dohi

(10) Patent No.: US 11,027,383 B2
(45) Date of Patent: Jun. 8, 2021

(54) WORKPIECE CLAMPING DEVICE, AND PROCESSING SYSTEM HAVING WORKPIECE CLAMPING DEVICE

(71) Applicant: FANUC CORPORATION, Yamanashi (JP)

(72) Inventor: Yoshiaki Dohi, Yamanashi (JP)

(73) Assignee: FANUC CORPORATION, Yamanashi (JP)

(\*) Notice: Subject to any disclaimer, the term of this patent is extended or adjusted under 35 U.S.C. 154(b) by 81 days.

(21) Appl. No.: 15/417,392

(22) Filed: Jan. 27, 2017

(65) Prior Publication Data

US 2017/0216983 A1    Aug. 3, 2017

(30) Foreign Application Priority Data

Feb. 2, 2016 (JP) .............................. JP2016-018374

(51) Int. Cl.
*B23Q 3/10* (2006.01)
*B25J 15/00* (2006.01)
(Continued)

(52) U.S. Cl.
CPC .......... *B23Q 3/103* (2013.01); *B23B 31/1071* (2013.01); *B23Q 1/0081* (2013.01);
(Continued)

(58) Field of Classification Search
CPC ...... B23Q 3/103; B23Q 3/082; B23Q 1/0081; B23Q 3/06; B23Q 1/0072; B25B 5/064;
(Continued)

(56) References Cited

U.S. PATENT DOCUMENTS 5,354,196 A \* 10/1994 Ziv-Av ................ B29C 45/1761
100/214
6,378,855 B1 \* 4/2002 Sawdon .................. B25B 5/064
269/32
(Continued)

FOREIGN PATENT DOCUMENTS

CN      101324249 A    12/2008
DE      10312192 B3     8/2004
(Continued)

OTHER PUBLICATIONS

FORWELL Quick Die Change System ( QDCS ) Published on Mar. 7, 2011 at https://www.youtube.com/watch?v=LqTdMBBdwuQ.\*
(Continued)

*Primary Examiner* — Tyrone V Hall, Jr.
*Assistant Examiner* — Mahdi H Nejad
(74) *Attorney, Agent, or Firm* — Fredrikson & Byron, P.A.

(57) ABSTRACT

A workpiece clamping device able to perform a set-up changing operation for clamping members depending on the kind of a workpiece to be processed, at a low cost, by a simple method. The workpiece clamping device includes a bracket, a movable part which is movable with respect to the bracket, a clamping member to be attached to and detached from the bracket or the movable part, to clamp a workpiece, and a detachable device for detachably coupling the bracket or the movable part to the clamping member.

7 Claims, 22 Drawing Sheets

(51) Int. Cl.

| | |
|---|---|
| *B23Q 1/00* | (2006.01) |
| *B25B 1/24* | (2006.01) |
| *B23Q 3/08* | (2006.01) |
| *B25B 5/06* | (2006.01) |
| *B29C 45/17* | (2006.01) |
| *B23B 31/107* | (2006.01) |
| *B25B 1/18* | (2006.01) |
| *B25J 9/00* | (2006.01) |

(52) U.S. Cl.
CPC ............... *B23Q 3/082* (2013.01); *B25B 1/18* (2013.01); *B25B 1/2421* (2013.01); *B25B 1/2457* (2013.01); *B25B 5/064* (2013.01); *B25J 9/0096* (2013.01); *B25J 15/00* (2013.01); *B29C 45/1756* (2013.01)

(58) Field of Classification Search
CPC ....... B25B 1/2457; B25B 1/2421; B25B 1/18; B25B 1/20; B25B 5/003; B25B 1/2415; B25B 5/068; B25B 5/102; B25B 5/087; B25J 9/0096; B25J 15/00; B25J 15/0014; Y10S 269/902; Y10S 279/905; B29C 33/30; B29C 23/0088; B29C 45/1756; B29C 66/8167; B29C 2049/283; B29C 31/006; B23B 31/16004; B23B 31/1071; B21J 13/085
USPC .............................................. 269/25, 58, 32
See application file for complete search history.

(56) References Cited

U.S. PATENT DOCUMENTS

| | | | | |
|---|---|---|---|---|
| 6,527,266 | B1* | 3/2003 | Yonezawa | B23Q 1/0081 269/309 |
| 6,976,671 | B2* | 12/2005 | Migliori | B25B 5/122 269/32 |
| 7,029,000 | B2* | 4/2006 | Petit | B25B 5/087 269/32 |
| 8,459,626 | B2* | 6/2013 | Sawdon | B25B 5/062 269/228 |
| 9,254,572 | B2* | 2/2016 | Strotzer | B25J 15/04 |
| 9,687,934 | B2* | 6/2017 | Schindele | B23K 20/1215 |
| 2004/0247737 | A1* | 12/2004 | Ha | B29C 45/42 425/556 |
| 2008/0061486 | A1* | 3/2008 | Kuroda | B23Q 1/0081 269/48.1 |
| 2009/0145707 | A1* | 6/2009 | Henneberg | B60G 13/00 188/322.12 |
| 2010/0308524 | A1* | 12/2010 | Kitaura | B23Q 1/0081 269/309 |
| 2012/0107442 | A1* | 5/2012 | Starkey | B29C 33/301 425/451.9 |
| 2014/0246824 | A1* | 9/2014 | Fiegener | B25B 1/2478 269/265 |
| 2016/0214301 | A1* | 7/2016 | Pirog | B29C 45/76 |
| 2016/0250678 | A1* | 9/2016 | Hall | B21D 37/14 483/1 |
| 2017/0297208 | A1* | 10/2017 | Sherwood | B25J 15/0616 |
| 2018/0056557 | A1* | 3/2018 | Fukumoto | B29C 45/1756 |
| 2019/0061077 | A1* | 2/2019 | Barton | B23Q 3/061 |
| 2019/0152102 | A1* | 5/2019 | Kitaura | B29C 33/30 |
| 2019/0152103 | A1* | 5/2019 | Inoue | B29C 45/07 |

FOREIGN PATENT DOCUMENTS

| | | | |
|---|---|---|---|
| EP | 0471603 | A1 | 2/1992 |
| FR | 2392764 | A1 | 12/1978 |
| JP | 5442090 | A | 4/1979 |
| JP | 59152036 | A | 8/1984 |
| JP | 61117087 | A | 6/1986 |
| JP | 343174 | A | 2/1991 |
| JP | 5237734 | A | 9/1993 |
| JP | 2725130 | * | 1/1994 |
| JP | 717441 | U | 3/1995 |
| JP | 2003245835 | A | 9/2003 |
| JP | 2007125679 | A | 5/2007 |
| JP | 2013177932 | A | 9/2013 |
| JP | 2017136659 | A | 8/2017 |
| WO | 2014179358 | A1 | 11/2014 |

OTHER PUBLICATIONS

English Abstract and Machine Translation for Japanese Publication No. 2007-125679 A, published May 24, 2007, 19 pgs.
English Abstract and Machine Translation for Japanese Publication No. 2003-245835 A, published Sep. 2, 2003, 12 pgs.
English Machine Translation for Japanese Publication No. JPH07-017441 U, published Mar. 28, 1995, 7 pgs.
English Abstract and Machine Translation for Japanese Publication No. JPS59-152036 A, published Aug. 30, 1984, 6 pgs.
English Abstract and Machine Translation for Japanese Publication No. 05-237734 A, published Sep. 17, 1993, 12 pgs.
English Abstract and Machine Translation for Japanese Publication No. 2013-177932 A, published Sep. 9, 2013, 21 pgs.
English Machine Translation for Japanese Publication No. JPS 54-042090 A, published Apr. 3, 1979, 3 pgs.
English Abstract and Machine Translation for Japanese Publication No. 2017-136659 A, published Aug. 10, 2017, 64 pgs.
English Abstract and Machine Translation for Chinese Publication No. CN101324249A, published Dec. 17, 2008, 6 pgs.
English Abstract and Machine Translation for French Publication No. FR 2392764 A1, published Dec. 29, 1978, 7 pgs.
English Abstract and Machine Translation for German Publication No. DE 10312192 B3, published Aug. 5, 2004, 8 pgs.
English Machine Translation for Japanese Publication No. JPS61-117087 A, published Jun. 4, 1986, 5 pgs.
English Abstract and Machine Translation for Japanese Publication No. JPH03-043174 A, published Feb. 25, 1991, 10 pgs.
English Abstract and Machine Translation for European Publication No. 0471603 A1, published Feb. 19, 1992, 7 pgs.

* cited by examiner

WORKPIECE CLAMPING DEVICE, AND PROCESSING SYSTEM HAVING WORKPIECE CLAMPING DEVICE

BACKGROUND OF THE INVENTION

1. Field of the Invention

The invention relates to a workpiece clamping device, and a processing system provided with the workpiece clamping device.

2. Description of the Related Art

In machine tools, devices for changing a jig for clamping a workpiece have been known (e.g., Japanese Unexamined Patent Publication (Kokai) No. 5-237734).

Machine tools are required to process various workpieces in some cases. In this instance, various clamping members corresponding to the kinds of workpieces are needed to clamp the various workpieces. Technologies for changing clamping members depending on the kinds of workpieces to be processed, by an easier method at a lower cost, have conventionally been demanded.

SUMMARY OF THE INVENTION

In an aspect of the invention, a workpiece clamping device includes a bracket, a movable part provided movable with respect to the bracket, a clamping member detachably attached to the bracket or the movable part so as to clamp a workpiece, and a detachable device configured to detachably couple the bracket or the movable part and the clamping member with each other.

The detachable device may include a coupling shaft provided so as to project out from any one of the bracket or movable part and the clamping member, and a hole formed at the other one of the bracket or movable part and the clamping member so as to slidably receive the coupling shaft.

The workpiece clamping device may further include a drive part configured to drive the movable part, and including a cylinder shaft coupled to the movable part, and a cylinder main body (66) configured to receive the cylinder shaft to be able to advance and retract; and a spacer configured to be fitted over the outer periphery of the cylinder shaft between the cylinder main body and the movable part.

In another aspect of the invention, a processing system includes the above-mentioned workpiece clamping device and a robot including a robot hand able to grip the clamping member. The robot grips the clamping member by the robot hand so as to attach and detach the clamping member to and from the bracket or the movable part.

BRIEF DESCRIPTION OF THE DRAWINGS

These and other objects, features, and advantages of the invention will be clarified by the detailed description of embodiments illustrated in the accompanying drawings, in which.

DETAILED DESCRIPTION

Figure 1:
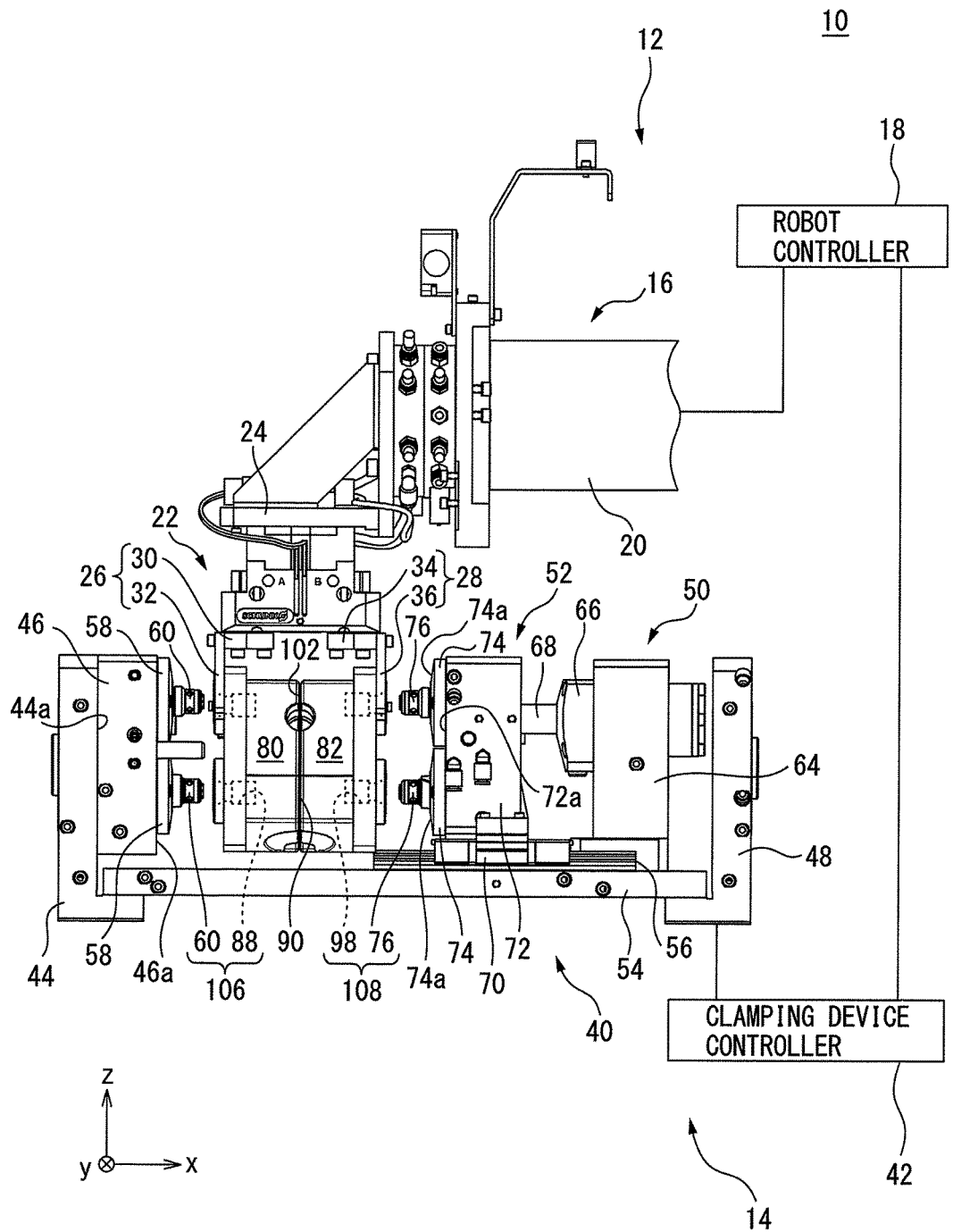
FIG. 1 is a view of a processing system according to an embodiment.

Embodiments of the invention will be described below in detail based on the drawings. First, with reference to FIGS. 1 to 6, a processing system 10 according to an embodiment of the invention will be described. Note that, in the following description, the orthogonal coordinate system in the drawings is used as a standard for directions, and, for convenience, the x-axis positive direction is referred to as a right direction (rightward), the y-axis positive direction is referred to as a front direction (frontward), and the z-axis positive direction is referred to as a upper direction (upward).

The processing system 10 includes a robot system 12 and a workpiece clamping system 14. The robot system 12 includes a robot 16 and a robot controller 18. The robot 16 includes a manipulator 20 and a robot hand 22.

The manipulator 20 includes servomotors (not shown) built therein, and moves the robot hand 22. The robot hand 22 includes a hand base 24, a plurality of fingers 26 and 28 provided at the hand base 24 so as to open and close, and a finger drive part (not shown) configured to generate power to open and close the fingers 26 and 28. The finger drive part includes e.g. a servomotor, or a pneumatic or hydraulic cylinder (not shown).

The finger 26 includes a proximal end part 30 and two fingertips 32 extending from the proximal end part 30 so as to branch from each other. Claws (not shown) are formed at distal ends of the respective fingertip 32 so as to project rightward.

The finger 28 is arranged at rightward of the finger 26. The finger 28 includes a proximal end part 34 and two fingertips 36 extending from the proximal end part 34 so as to branch from each other. Claws (not shown) are formed at distal ends of the respective fingertips 36 so as to project leftward.

The robot controller 18 transmits a command to each servomotor built in the manipulator 20 so as to operate the manipulator 20. The robot controller 18 also transmits a command to the finger drive part provided in the robot hand 22 so as to open and close the fingers 26 and 28.

Figure 2:
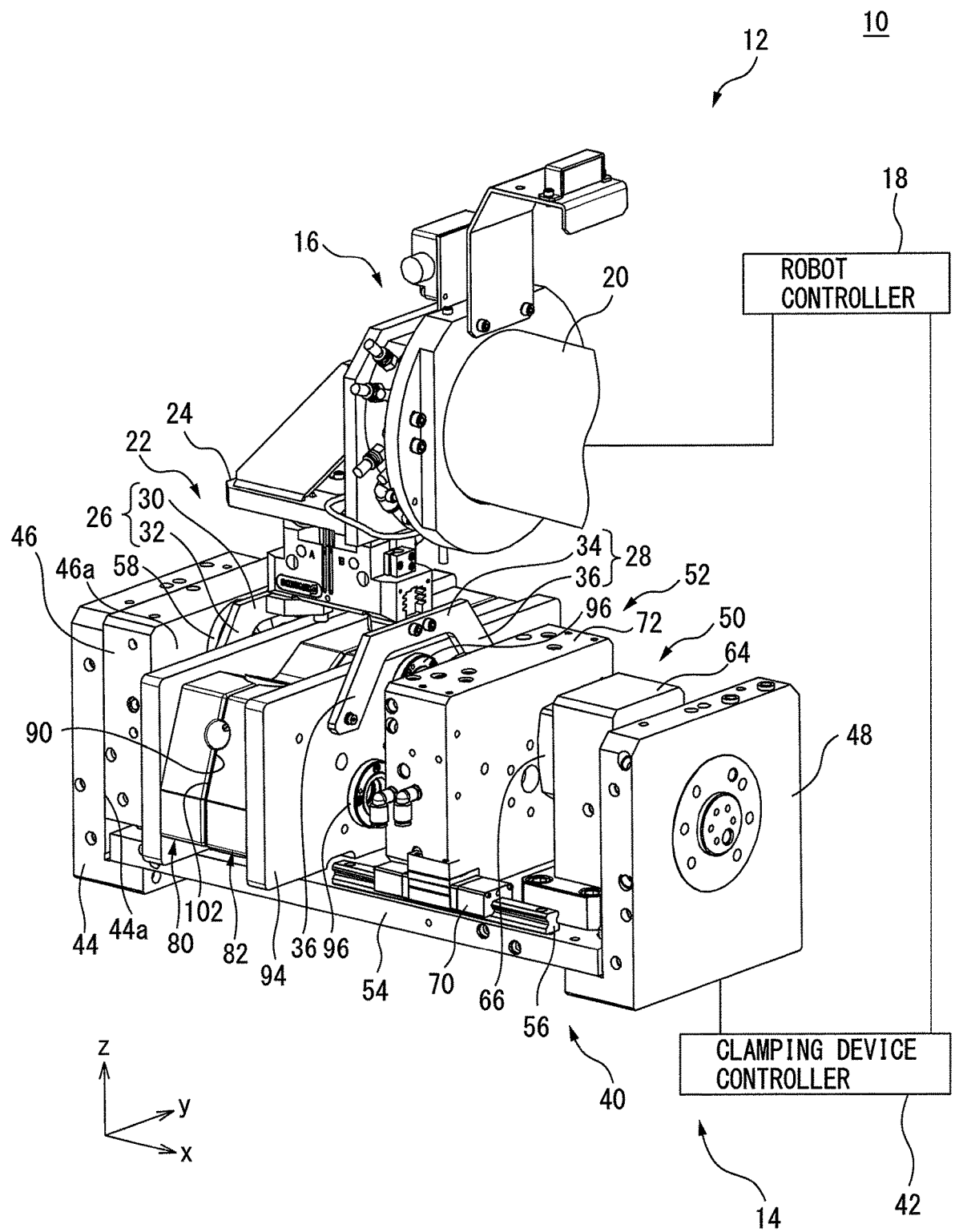
FIG. 2 is a perspective view of the processing system shown in FIG. 1.
Figure 3:
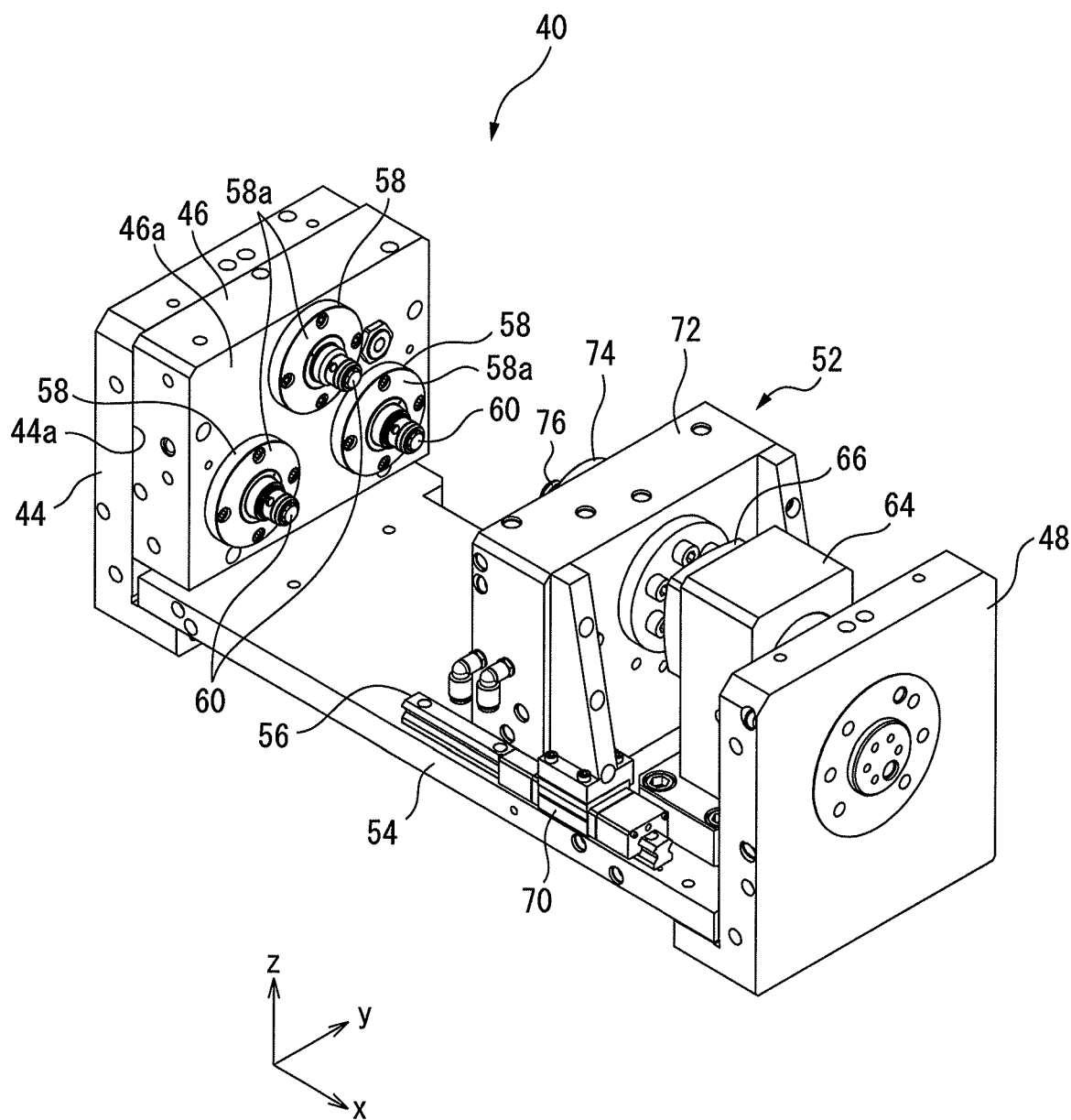
FIG. 3 is a perspective view of a part of the workpiece clamping device shown in FIG. 1.

The workpiece clamping system 14 includes a workpiece clamping device 40 and a clamping device controller 42. As shown in FIGS. 1 to 3, the workpiece clamping device 40 includes a first support base 44, a bracket 46, a second support base 48, a drive part 50, and a movable part 52.

The first support base 44 and the second support base 48 are fixed on a floor of a work cell so as to be separate from each other in the right-left direction. A base plate 54 is fixed to the first support base 44 and the second support base 48.

The base plate 54 extends between the first support base 44 and the second support base 48. A pair of rails 56 are fixed on the base plate 54 so as to be arranged separate from each other in the front-rear direction. Each rail 56 straightly extends in the right-left direction. Note that, in FIGS. 1 to 3, only the rear-side one of the pair of rails 56 is illustrated.

The bracket 46 is fixed to a right end face 44a of the first support base 44. The bracket 46 includes a total of three columnar bosses 58 projecting rightward from a right end face 46a of the bracket 46. A total of three coupling shafts 60 are fixedly provided at right end faces 58a of the bosses 58, respectively.

Figure 4:
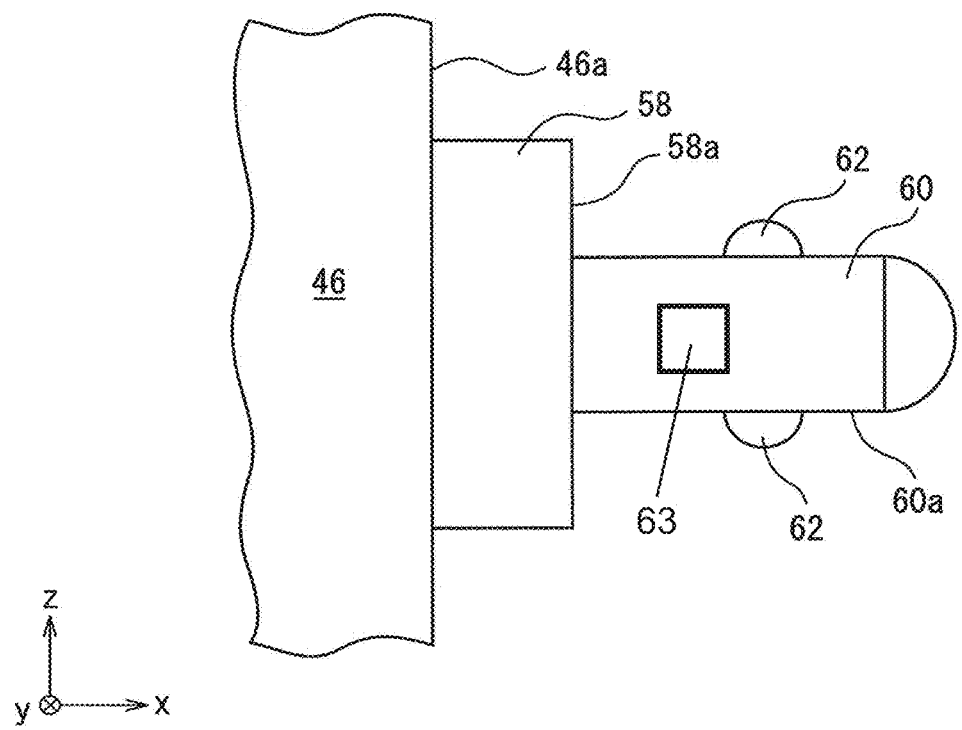
FIG. 4 is a view of one of coupling shafts provided at the bracket shown in FIG. 3.

As shown in FIGS. 3 and 4, each coupling shaft 60 is a substantially-columnar rod member extending rightward from the right end face 58a of the corresponding boss 58. A plurality of claws 62 are movably provided at each coupling shaft 60.

The claws 62 are respectively received in holes (not shown) formed at the coupling shaft 60 so as to be recessed inward from an outer peripheral surface 60a of the coupling shaft 60. Each claw 62 can move in a radial direction of the coupling shaft 60 between a projection position, at which the claw projects out from the outer peripheral surface 60a of the coupling shaft 60, and a retraction position, at which the claw retracts inward from the outer peripheral surface 60a of the coupling shaft 60.

Each claw 62 is biased toward radially outside of the coupling shaft 60 by a biasing part 63 provided in the coupling shaft 60. The biasing part 63 includes e.g. springs arranged in the holes formed at the coupling shaft 60, or a pneumatic or hydraulic cylinder configured to advance or retract the claw 62 in accordance with a command from the clamping device controller 42.

The drive part 50 is a hydraulic or pneumatic cylinder. Specifically, the drive part 50 includes a third support base 64, a cylinder main body 66 supported by the third support base 64, and a cylinder shaft 68 received in the cylinder main body 66 so as to be able to advance or retract.

The third support base 64 is fixed on the base plate 54. The cylinder main body 66 is a hollow member, and includes a piston (not shown) therein. The piston is coupled to the cylinder shaft 68, and is driven to advance and retract in the right-left direction in response to a pressure of a fluid (e.g., oil or compression gas) supplied from an external device (not shown) into the cylinder main body 66. Due to this, the cylinder shaft 68 advances and retracts in the right-left direction. The tip end of the cylinder shaft 68 is coupled to a side plate 72.

The movable part 52 is arranged on the base plate 54 so as to move in the right-left direction. Specifically, the movable part 52 includes a pair of engagement parts 70 provided separate from each other in the front-rear direction, and the side plate 72 fixed on the engagement parts 70.

The pair of engagement parts 70 slidably engage the pair of rails 56, respectively. Note that, in FIGS. 1 to 3, only the rear-side one of the pair of engagement parts 70 is illustrated. The movable part 52 is guided so as to move in the right-left direction along the rails 56, by the engagement between the engagement parts 70 and the rails 56.

The side plate 72 includes a total of three columnar bosses 74 projecting leftward from a left end face 72a of the side plate 72. A total of three coupling shafts 76 are fixedly provided at left end faces 74a of the bosses 74, respectively.

In this embodiment, the coupling shafts 76 are arranged so that the positions of these coupling shafts 76 in y-z plane respectively coincide with the positions of the coupling shafts 60 in y-z plane.

Figure 5:
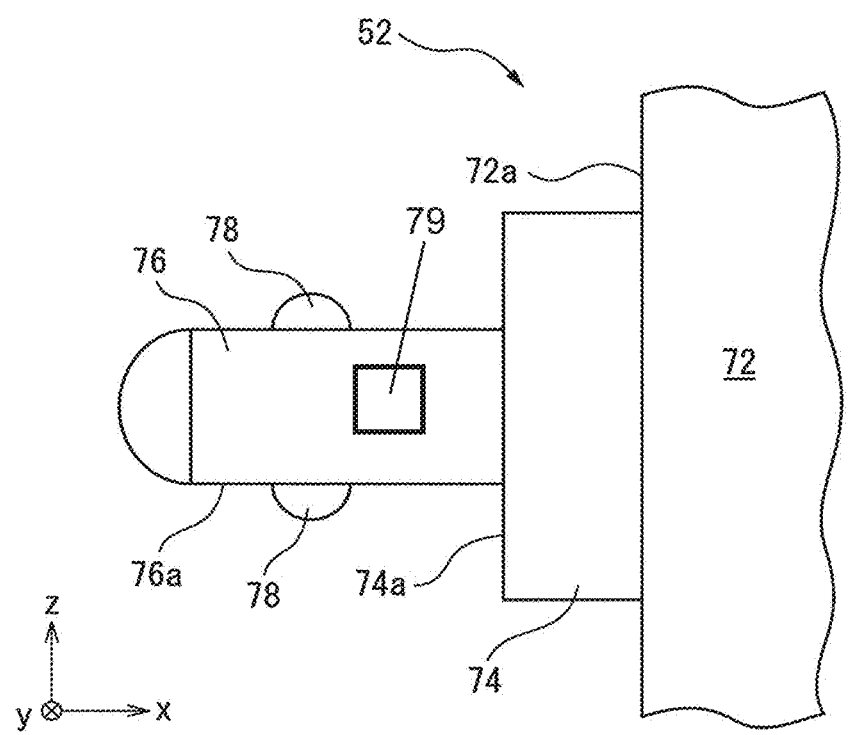
FIG. 5 is a view of one of coupling shafts provided at the movable part shown in FIG. 3.

As shown in FIGS. 1 and 5, each coupling shaft 76 is a substantially-columnar rod member extending leftward from the left end face 74a of the corresponding boss 74. A plurality of claws 78 are movably provided at each coupling shaft 70.

The claws 78 are respectively received in holes (not shown) formed at each coupling shaft 76 so as to be recessed inward from an outer peripheral surface 76a of the coupling shaft 76. Each claw 78 can move in the radial direction of the coupling shaft 60 between a projection position, at which the claw projects out from the outer peripheral surface 76a of the coupling shaft 76, and a retraction position, at which the claw retracts inward from the outer peripheral surface 76a of the coupling shaft 76.

Each claw 78 is biased toward radially outside of the coupling shaft 76 by a biasing part 79 provided in the coupling shaft 76. The biasing part 79 includes e.g. springs arranged in the holes formed at the coupling shaft 76, or a pneumatic or hydraulic cylinder configured to advance or retract the claw 78 in accordance with a command from the clamping device controller 42.

As shown in FIGS. 1 and 2, the workpiece clamping device 40 further includes a first clamping member 80 and a second clamping member 82. The first clamping member 80 and the second clamping member 82 are configured to clamp a workpiece by sandwiching the workpiece therebetween.

Figure 6:
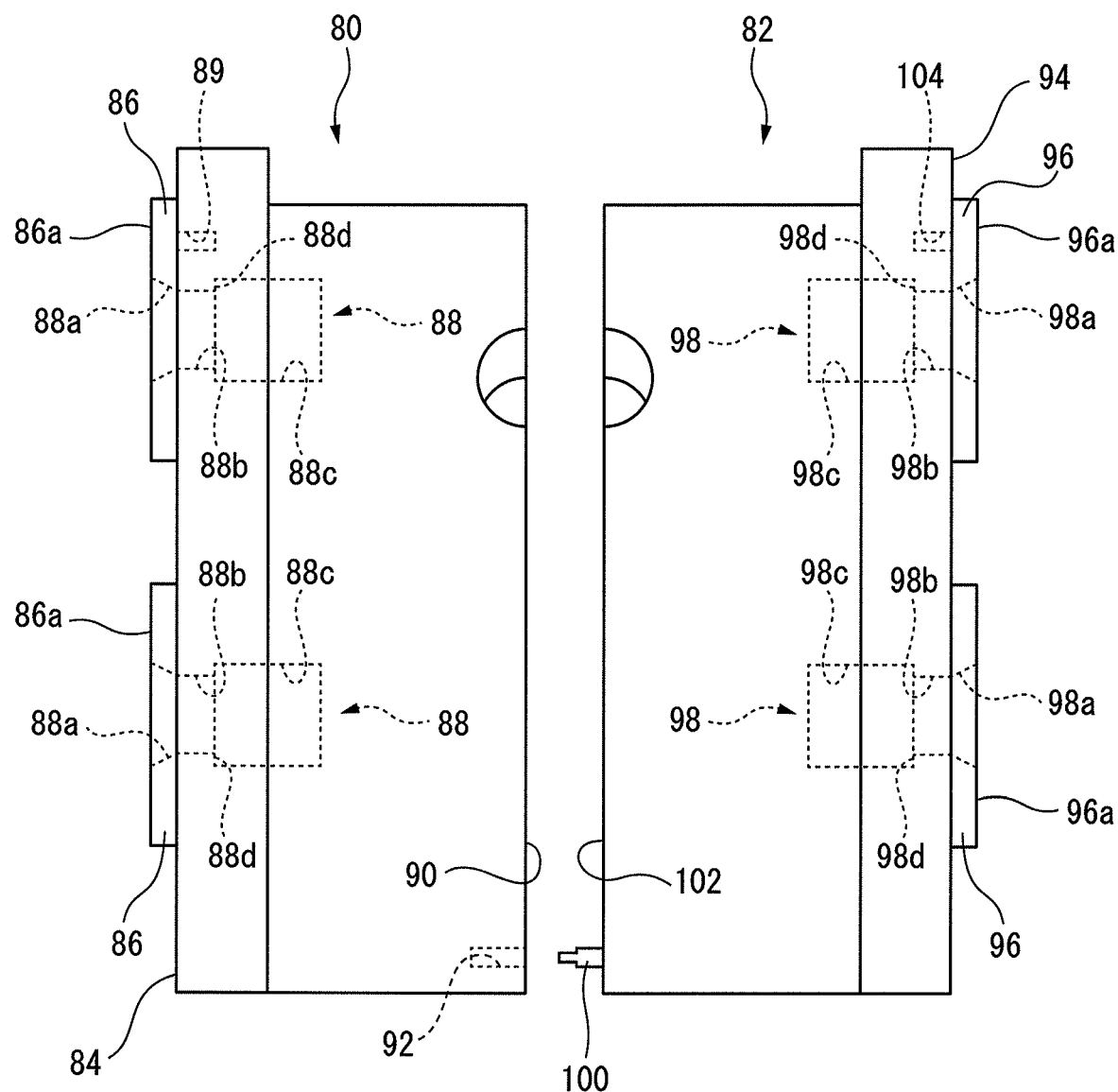
FIG. 6 is an enlarged view of the first and second clamping members shown in FIG. 1.

In this embodiment, the first clamping member 80 is detachably attached to the bracket 46. As shown in FIG. 6, the first clamping member 80 includes a total of three columnar bosses 86 provided so as to project leftward from an end face 84 of the first clamping member 80.

A total of three holes 88 are formed at the first clamping member 80 so as to be recessed rightward from respective left end faces 86a of the bosses 86. Each of the holes 88 has a circular outer shape, and can slidably receive the corresponding coupling shaft 60.

Specifically, each hole 88 includes a first hole part 88a, a second hole part 88b, and a third hole part 88c. The first hole part 88a is defined by a tapered surface having a diameter gradually increasing toward the left side.

The second hole part 88b has a diameter substantially the same as that of the right end of the tapered surface defining the first hole part 88a. The third hole part 88c has a diameter larger than that of the second hole part 88b, and thereby, a stepped portion 88d is formed at a connection between the second hole part 88b and the third hole part 88c.

Further, a total of two claw-receiving holes 89 are formed at the first clamping member 80 so as to be recessed rightward from the left end face 84 of the first clamping member 80. The claw-receiving holes 89 can respectively receive the above-mentioned claws provided at the distal ends of the fingertips 32 of the robot hand 22. In this embodiment, the claw-receiving holes 89 are arranged so that one of them is separate frontward of the upper boss 86, while the other of them is separate rearward of the upper boss 86.

Further, a pin-receiving hole 92 is formed at the first clamping member 80 so as to be recessed leftward from a right end face 90 of the first clamping member 80.

On the other hand, the second clamping member 82 is detachably attached to the side plate 72 of the movable part 52. The second clamping member 82 includes a total of three columnar bosses 96 provided so as to project rightward from a right end face 94 of second clamping member 82.

A total of three holes 98 are formed at the second clamping member 82 so as to be recessed leftward from right end faces 96a of the bosses 96, respectively. Each of the holes 98 has a circular outer shape, and can slidably receive the corresponding coupling shaft 76.

Specifically, each hole 98 includes a first hole part 98a, a second hole part 98b, and a third hole part 98c. The first hole part 98a is defined by a tapered surface having a diameter gradually increasing toward the right side.

The second hole part 98b has a diameter substantially the same as that of the left end of the tapered surface defining the first hole part 98a. The third hole part 98c has a diameter larger than that of the second hole part 98b, and thereby, a stepped portion 98d is formed at a connection between the second hole part 98b and the third hole part 98c.

Further, a total of two claw-receiving holes 104 are formed at the second clamping member 82 so as to be recessed leftward from the right end face 94 of the second clamping member 82. The claw-receiving holes 104 can respectively receive the above-mentioned claws provided at the tip ends of the fingertips 36 of the robot hand 22. In this embodiment, the claw-receiving holes 104 are arranged so that one of them is separate frontward of the upper boss 96, while the other of them is separate rearward of the upper boss 96.

Further, a pin 100 is formed at the second clamping member 82 so as to project leftward from a left end face 102 of the second clamping member 82. The pin 100 can be received in the pin-receiving hole 92 formed at the first clamping member 80.

The clamping device controller 42 controls the drive part 50. Specifically, the clamping device controller 42 transmits a command to the drive part 50 so as to advance and retract the cylinder shaft 68 in the right-left direction. Thereby, the movable part 52 is moved in the right-left direction.

In this embodiment, the robot controller 18 and the clamping device controller 42 are communicably connected to each other. The robot controller 18 and the clamping device controller 42 carry out a process of changing the clamping members 80 and 82, along with communicating with each other. This process will be described later.

Next, with reference to FIG. 7, the operation of the processing system 10 will be described. In order to process a plurality of types of workpieces, the processing system 10 changes the clamping members of the workpiece clamping device 40 by the robot 16, in response to the type of the workpiece to be processed.

Figure 7:
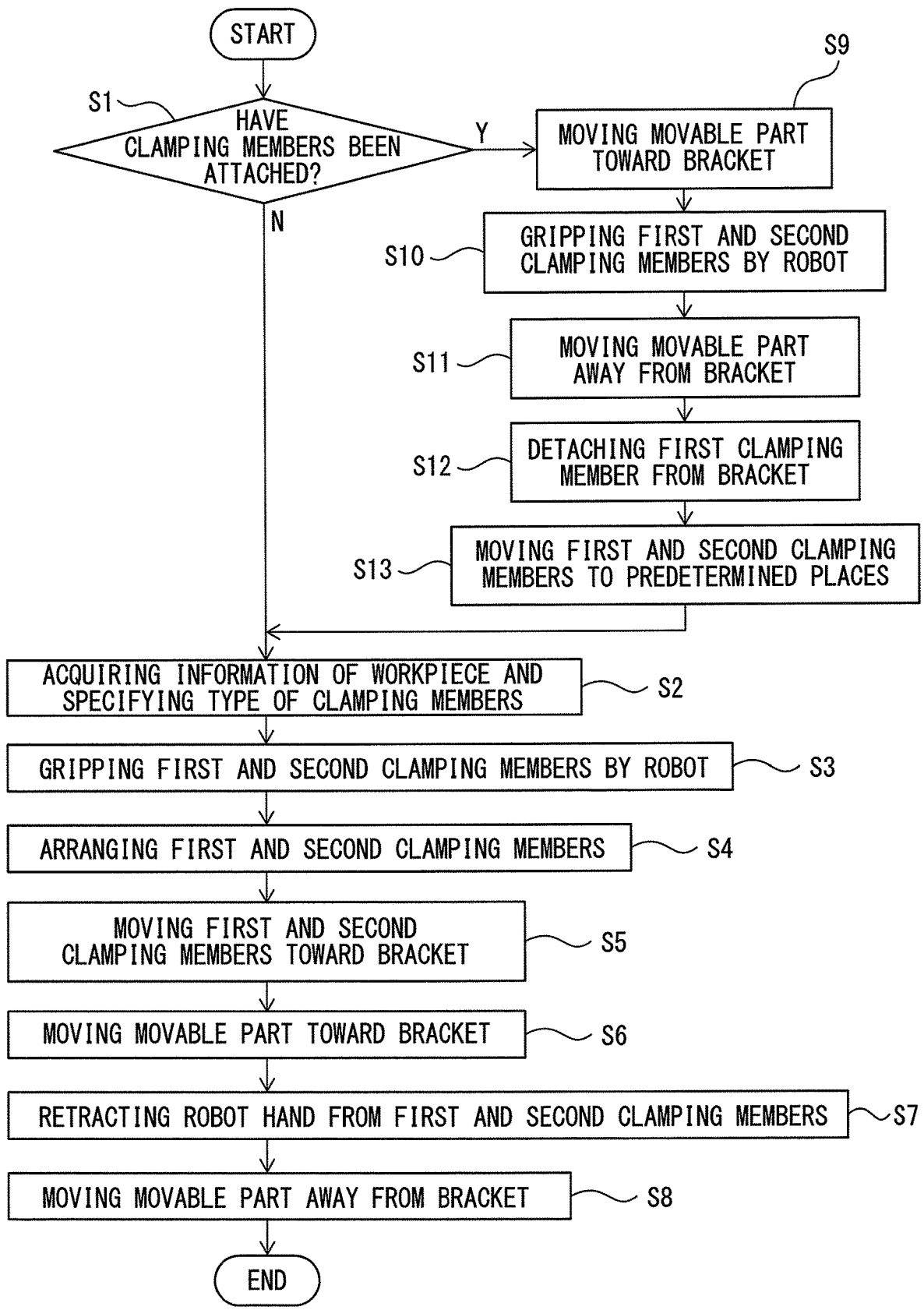
FIG. 7 is a flowchart of an example of the operation flow of the processing system shown in FIG. 1.

The process flow shown in FIG. 7 is started when the robot controller 18 or the clamping device controller 42 receives a command for changing the clamping members from a user, a host controller, or a processing program.

At step S1, the robot controller 18 or the clamping device controller 42 determines whether clamping members are attached to the bracket 46 and the side plate 72.

For example, the robot controller 18 or the clamping device controller 42 determines whether clamping members are attached to the bracket 46 and the side plate 72, based on an input signal from a user or a processing program.

When the robot controller 18 or the clamping device controller 42 determines that the clamping members are attached to the bracket 46 and the side plate 72 (i.e., determines "YES"), it proceeds to step S9.

On the other hand, when the robot controller 18 or the clamping device controller 42 determines that the clamping members are not attached to the bracket 46 and the side plate 72 (i.e., determines "NO"), it proceeds to step S2.

At step S2, the robot controller 18 or the clamping device controller 42 acquires information of a workpiece to be processed next, and specifies the type of clamp members for clamping the workpiece to be processed.

Below, a case is described in which the robot controller 18 or the clamping device controller 42 specifies the first clamping member 80 and the second clamping member 82 shown in FIGS. 1 and 2 at this step S2.

At step S3, the robot controller 18 grippes the first clamping member 80 and the second clamping member 82 stored in a predetermined place by the robot hand 22.

In this embodiment, the first clamping member 80 and the second clamping member 82 are stored to be coupled with each other so that the right end face 90 of the first clamping member 80 is in surface-contact with the left end face 102 of the second clamping member 82, as shown in FIG. 1. In this state, the pin 100 provided at the second clamping member 82 is received in the pin-receiving hole 92 provided at the first clamping member 80.

At this step S3, the robot controller 18 transmits a command to each servomotor built in the manipulator 20 in accordance with a robot program, so as to move the robot hand 22 to a position of the first clamping member 80 and the second clamping member 82 stored in the predetermined place.

At this time, the claws provided at the distal ends of the fingertips 32 of the robot hand 22 are positioned so as to respectively face the claw-receiving holes 89 formed at the first clamping member 80. On the other hand, the claws provided at the distal ends of the fingertips 36 of the robot hand 22 are positioned so as to respectively face the claw-receiving holes 104 of the second clamping member 82.

The robot program for causing the manipulator 20 to move the robot hand 22 can be constructed by teaching to the robot 16 the path of movement of the manipulator 20 when it carries out this operation.

Next, the robot controller 18 transmits a command to the finger drive part provided in the robot hand 22 so as to close the fingers 26 and 28 of the robot hand 22. As a result, the claws provided at the distal ends of the fingertips 32 of the robot hand 22 are respectively received in the claw-receiving holes 89 of the first clamping member 80, and engage the claw-receiving holes 89.

Further, the claws provided at the distal ends of the fingertips 36 of the robot hand 22 are respectively received in the claw-receiving holes 104 of the second clamping member 82, and engage the claw-receiving holes 104. Thus, the robot hand 22 grips the first clamping member 80 and the second clamping member 82 stored in the predetermined place.

At step S4, the robot controller 18 arranges the first clamping member 80 and the second clamping member 82 gripped by the robot hand 22 at a position between the bracket 46 and the side plate 72.

Specifically, the robot controller 18 operates the manipulator 20 in accordance with the robot program so as to move the robot hand 22 griping the first clamping member 80 and the second clamping member 82. Then, the robot controller 18 arranges the first clamping member 80 and the second clamping member 82 at the position shown in FIGS. 1 and 2.

As described above, in this embodiment, the pin 100 formed at the second clamping member 82 is received in the pin-receiving hole 92 formed at the first clamping member 80.

By the engagement between the pin 100 and the pin-receiving hole 92, it is possible to prevent the first clamping member 80 and the second clamping member 82 from being separated from each other when the first clamping member 80 and the second clamping member 82 are gripped and lifted by the robot hand 22 at this step S4.

In the state shown in FIGS. 1 and 2, the holes 88 provided at the first clamping member 80 are respectively positioned at rightward of the coupling shafts 60 provided at the bracket 46. On the other hand, the holes 98 provided at the second clamping member 82 are respectively positioned at leftward of the coupling shafts 76 provided at the side plate 72.

At step S5, the robot controller 18 moves the first clamping member 80 and the second clamping member 82 gripped by the robot hand 22 toward the bracket 46.

Figure 9:
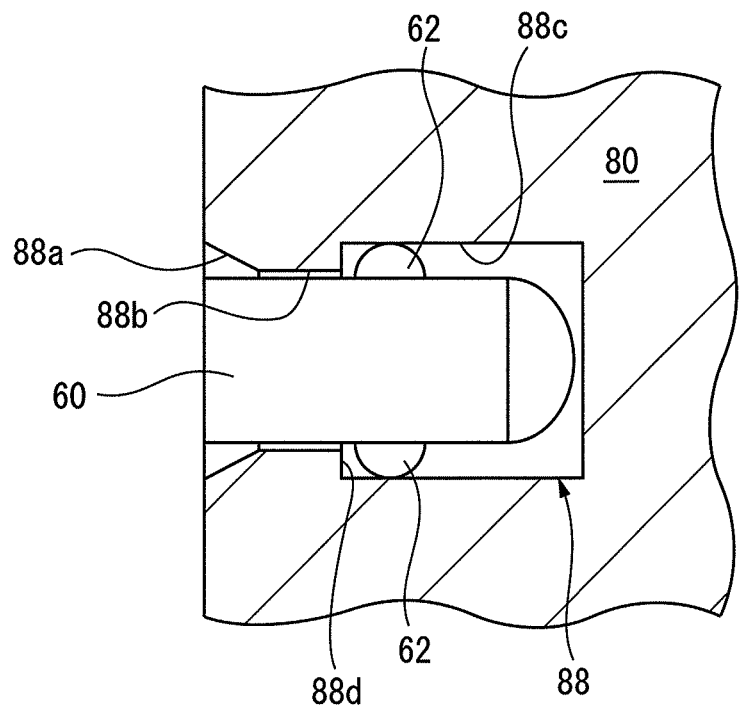
FIG. 9 shows a state where the coupling shaft provided at the bracket is inserted into the hole of the first clamping member at step S5 in FIG. 7.

Specifically, the robot controller 18 operates the manipulator 20 in accordance with the robot program so as to move the robot hand 22 griping the first clamping member 80 and the second clamping member 82 leftward from the position shown in FIGS. 1 and 2. Consequently, the coupling shafts 60 provided at the bracket 46 are respectively inserted into the holes 88 provided at the first clamping member 80, as shown in FIG. 9.

In an example in which the biasing part for biasing the claws 62 is comprised of the springs, when the coupling shafts 60 are inserted into the holes 88 at this step S5, the claws 62 provided at each coupling shaft 60 are displaced to the retraction position during they pass the second hole part 88b, and returned to the projection position when they reach the third hole part 88c, thereby they engage the stepped portion 88d.

In another example in which the biasing part for biasing the claws 62 is comprised of the cylinder, the clamping device controller 42 transmits a command to the biasing part so as to retract the claws 62 to the retraction position, before the first clamping member 80 and the second clamping member 82 are moved at this step S5.

Then, if the first clamping member 80 and the second clamping member 82 are moved leftward at this step S5 so that the claws 62 pass the second hole part 88b and reach the third hole part 88c, the clamping device controller 42 transmits a command to the biasing part so as to push the claws 62 to the projection position. As a result, the claws 62 engage the stepped portion 88d.

By this step S5, the right end faces 58a of the bosses 58 provided at the bracket 46 respectively contact the left end faces 86a of the bosses 86 provided at the first clamping member 80, thereby the first clamping member 80 is attached to the bracket 46.

At step S6, the clamping device controller 42 operates the drive part 50 so as to move the movable part 52 toward the bracket 46. Specifically, the clamping device controller 42 operates the drive part 50 so as to push the cylinder shaft 68 leftward, thereby the movable part 52 is moved leftward.

Figure 8:
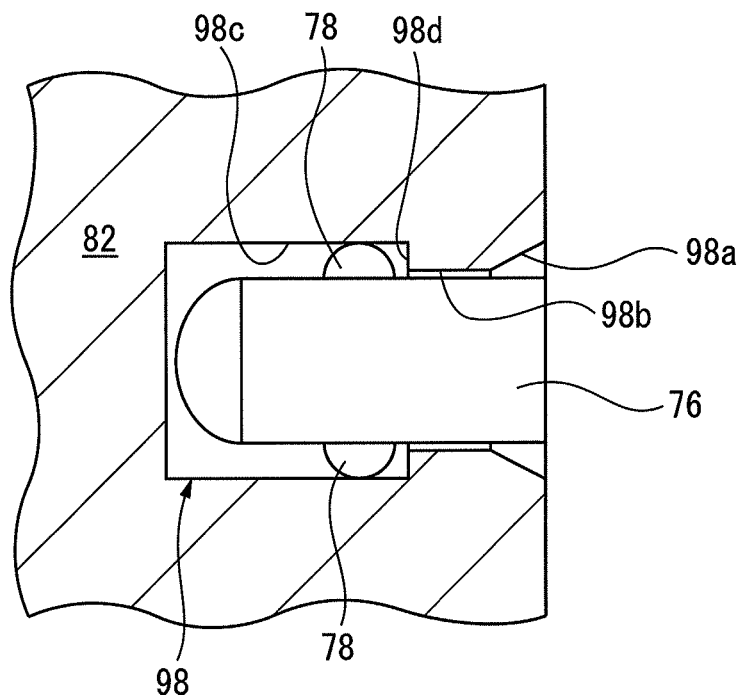
FIG. 8 shows a state where the coupling shaft provided at the movable part is inserted into the hole of the second clamping member at step S6 in FIG. 7.

As a result, the coupling shafts 76 provided at the side plate 72 are respectively inserted into the holes 98 provided at the second clamping member 82, as shown in FIG. 8.

When the coupling shafts 76 are inserted into the holes 98, similarly as the above-mentioned claws 62, the claws 78 provided at the coupling shafts 76 are arranged at the retraction position by the biasing part during they pass the second hole part 98b, and pushed to the projection position when they reach the third hole part 98c, thereby the claws 78 engage the stepped portion 98d.

Then, the left end faces 74a of the bosses 74 provided at the side plate 72 respectively contact the right end faces 96a of the bosses 96 provided at the second clamping member 82, thereby the second clamping member 82 is attached to the side plate 72.

Figure 10:
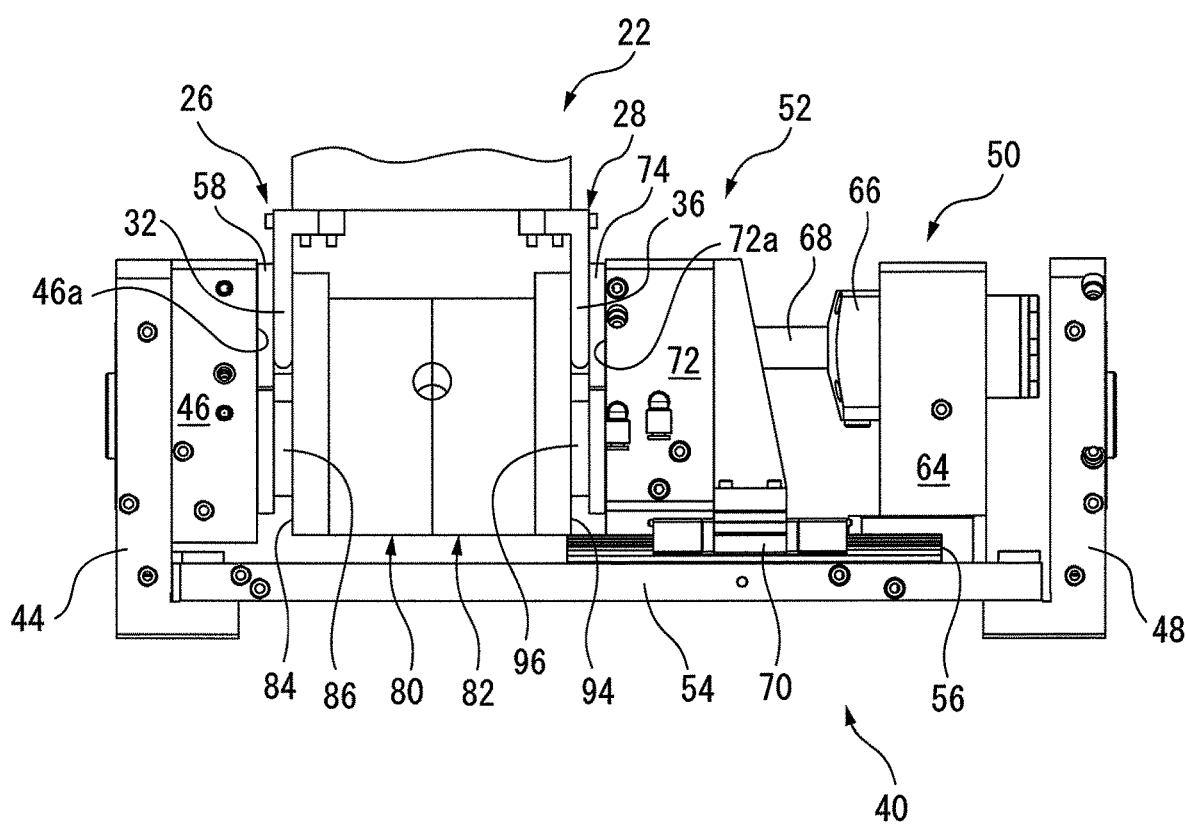
FIG. 10 shows a state at the end of step S6 in FIG. 7.

This state is shown in FIG. 10. In this state, the fingertips 32 of the robot hand 22 are arranged at a gap between the right end face 46a of the bracket 46 and the left end face 84 of the first clamping member 80 so as to be separate rightward from the right end face 46a. Further, the fingertips 32 are arranged to be separate from the bosses 58 of the bracket 46 and the bosses 86 of the first clamping member 80.

On the other hand, the fingertips 36 of the robot hand 22 are arranged at a gap between the left end face 72a of the side plate 72 and the right end face 94 of the second clamping member 82 so as to be separate leftward from the left end face 72a. Further, the fingertips 36 are separate from the bosses 74 of the side plate 72 and the bosses 96 of the second clamping member 82.

At step S7, the robot controller 18 causes the robot hand 22 to release the first clamping member 80 and the second clamping member 82, and retracts the robot hand 22 from the first clamping member 80 and the second clamping member 82.

Specifically, the robot controller 18 transmits a command to the finger drive part provided in the robot hand 22 so as to open the fingers 26 and 28 of the robot hand 22.

As described above, in the state shown in FIG. 10, the fingertips 32 and 36 of the robot hand 22 are respectively separate from the bosses 58 of the bracket 46 and the bosses 74 of the side plate 72. Therefore, the fingers 26 and 28 can be opened without interference with the bosses 58 and 74.

By opening the fingers 26 and 28 in this way, the claws provided at the fingertips 32 and 36 are respectively pulled out from the claw-receiving holes 89 and 104, thereby the robot hand 22 releases the first clamping member 80 and the second clamping member 82.

Consequently, the first clamping member 80 is hooked on the coupling shafts 60 provided at the bracket 46, while the second clamping member 82 is hooked on the coupling shafts 76 provided at the side plate 72.

Then, the robot controller 18 transmits a command to each servomotor built in the manipulator 20 so as to move the robot hand 22 away from the first clamping member 80 and the second clamping member 82.

At step S8, the clamping device controller 42 operates the drive part 50 so as to move the movable part 52 away from the bracket 46. Specifically, the clamping device controller 42 operates the drive part 50 so as to retract the cylinder shaft 68 rightward, thereby the movable part 52 is moved rightward.

At this time, the first clamping member 80 is hooked on the coupling shafts 60, wherein the claws 62 of the coupling shafts 60 engage the stepped portion 88d. In addition, the second clamping member 82 hooked on the coupling shafts 76, wherein the claws 78 of the coupling shafts 76 engage the stepped portion 98d.

Accordingly, when the movable part 52 is moved rightward at this step S8, the second clamping member 82 is moved rightward together with the movable part 52, as a result of which, the first clamping member 80 and the second clamping member 82 are separated from each other. Then, the robot controller 18 or the clamping device controller 42 ends the flow shown in FIG. 7.

On the other hand, when it is determined "YES" at step S1, at step S9, the clamping device controller 42 operates the drive part 50 so as to move the movable part 52 toward the bracket 46, similarly as the above-mentioned step S6.

Below, a case is described in which the first clamping member 80 and the second clamping member 82 shown in FIGS. 1 and 2 are respectively attached to the bracket 46 and the side plate 72 when it is determined "YES" at step S1.

In this case, if the clamping device controller 42 moves the movable part 52 toward the bracket 46 at this step S9, the right end face 90 of the first clamping member 80 and the left end face 102 of the second clamping member 82 are in surface-contact with each other, as shown in FIG. 10. Then, the pin 100 provided at the second clamping member 82 is received in the pin-receiving hole 92 provided at the first clamping member 80.

At step S10, the robot controller 18 causes the robot hand 22 to grip the first clamping member 80 and the second clamping member 82 in the state shown in FIG. 10.

Specifically, the robot controller 18 operates the manipulator 20 in accordance with the robot program so as to move the robot hand 22 to a position of the first clamping member 80 and the second clamping member 82.

At this time, the claws provided at the distal ends of the fingertips 32 of the robot hand 22 are respectively positioned at the claw-receiving holes 89 formed at the first clamping member 80, while the claws provided at the distal ends of the fingertips 36 of the robot hand 22 are respectively positioned at the claw-receiving holes 104 provided at the second clamping member 82.

Then, the robot controller 18 transmits a command to the finger drive part provided in the robot hand 22 so as to close the fingers 26 and 28 of the robot hand 22. Consequently, the claws provided at the distal ends of the fingertips 32 of the robot hand 22 are respectively received in the claw-receiving holes 89 of the first clamping member 80, and engage the claw-receiving holes 89.

Further, the claws provided at the distal ends of the fingertips 36 of the robot hand 22 are respectively received in the claw-receiving holes 104 of the second clamping member 82, and engage the claw-receiving holes 104. Thus, the first clamping member 80 and the second clamping member 82 are gripped by the robot hand 22 as shown in FIG. 10.

At step S11, the clamping device controller 42 operates the drive part 50 so as to move the movable part 52 away from the bracket 46, similarly as the above-mentioned step S8. At this time, the first clamping member 80 and the second clamping member 82 are gripped by the robot hand 22.

Accordingly, the movable part 52 is separated away from the second clamping member 82, along with which, the coupling shafts 76 provided at the side plate 72 are pulled out from the holes 98 provided at the second clamping member 82.

In an example in which the biasing part for biasing the claws 78 is comprised of the springs, when the coupling shafts 76 are pulled out from the holes 98 at this step S11, the claws 78 provided at the coupling shafts 76 are displaced to the retraction position during they pass the second hole part 98b. In this way, the second clamping member 82 is detached from the side plate 72.

In another example in which the biasing part for biasing the claws 78 is comprised of the cylinder, the clamping device controller 42 transmits a command to the biasing part so as to retract the claws 78 to the retraction position, before the movable part 52 is moved at this step S11. Due to this, the claws 78 can pass the second hole part 98b when the movable part 52 is moved rightward at this step S11.

At step S12, the robot controller 18 detaches the first clamping member 80 from the bracket 46.

Specifically, the robot controller 18 operates the manipulator so as to move the first clamping member 80 and the second clamping member 82 gripped by the robot hand 22 rightward. Due to this, the first clamping member 80 is separated away from the bracket 46, along with which, the coupling shafts 60 provided at the bracket 46 are pulled out from the holes 88 provided at the first clamping member 80.

When the coupling shafts 60 are pulled out from the holes 88, the claws 62 provided at the coupling shafts 60 are arranged at the retraction position during they pass the second hole part 88b by the action of the biasing part, similarly as the above-mentioned claws 78. Thus, the first clamping member 80 is detached from the bracket 46.

At step S13, the robot controller 18 transports the first clamping member 80 and the second clamping member 82 gripped by the robot hand 22 to a predetermined place, and places them there.

Subsequently, the robot controller 18 and the clamping device controller 42 carry out steps S2 to S8, and attach a pair of clamping members corresponding to the type of a workpiece to be processed next to the bracket 46 and the side plate 72, respectively.

Thus, the first clamping member 80 and the bracket 46 can be connected to and detached from each other in the right-left direction by the coupling shafts 60 and the holes 88 formed to slidably receive the coupling shafts 60. Therefore, the coupling shafts 60 and the holes 88 constitute a detachable device 106 (FIG. 1) configured to detachably couple the bracket 46 and the first clamping member 80 with each other.

Further, the second clamping member 82 and the side plate 72 of the movable part 52 can be connected to and detached from each other in the right-left direction by the coupling shafts 76 and the holes 98 formed to slidably receive the coupling shafts 76. Therefore, the coupling shafts 76 and the holes 98 constitute a detachable device 108 (FIG. 1) configured to detachably couple the movable part 52 and the second clamping member 82 with each other.

As described above, in this embodiment, the detachable devices 106 and 108 can detachably couple the bracket 46 and the first clamping member 80, and can detachably couple the movable part 52 and the second clamping member 82.

Accordingly, tooling change for the workpiece clamping device 40 can be carried out only by changing the first clamping member 80 and the second clamping member 82. Therefore, it is possible to easily carry out the tooling change of the clamping members in response to the type of a workpiece to be processed.

Further, in this embodiment, the detachable devices 106 and 108 are respectively comprised of the coupling shafts 60 and 76 and the holes 88 and 98 slidably receiving the coupling shafts 60 and 76.

According to this configuration, it is possible to attach and detach the first clamping member 80 to and from the bracket 46, and attach and detach the second clamping member 82 to and from the movable part 52 in the right-left direction. Due to this, the first clamping member 80 and the second clamping member 82 can be respectively attached to and detached from the bracket 46 and the side plate 72 by the robot 16.

Therefore, since the clamping members 80 and 82 can be automatically changed by the robot 16 in response to the type of a workpiece to be processed, it is possible to carry out the tooling change of the clamping members 80 and 82 in an easy and cost-effective manner.

Figure 11:
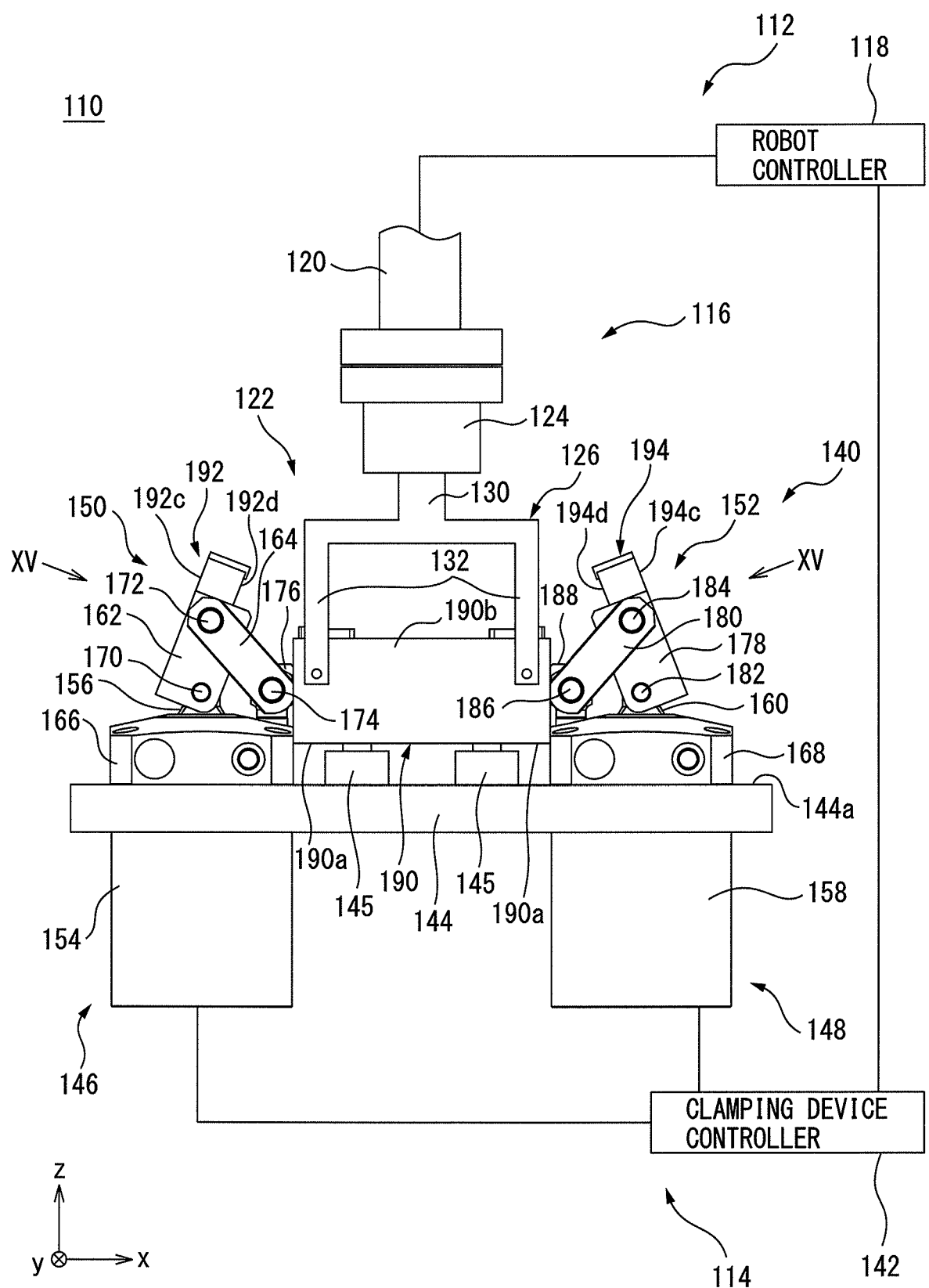
FIG. 11 is a view of a processing system according to another embodiment.
Figure 12:
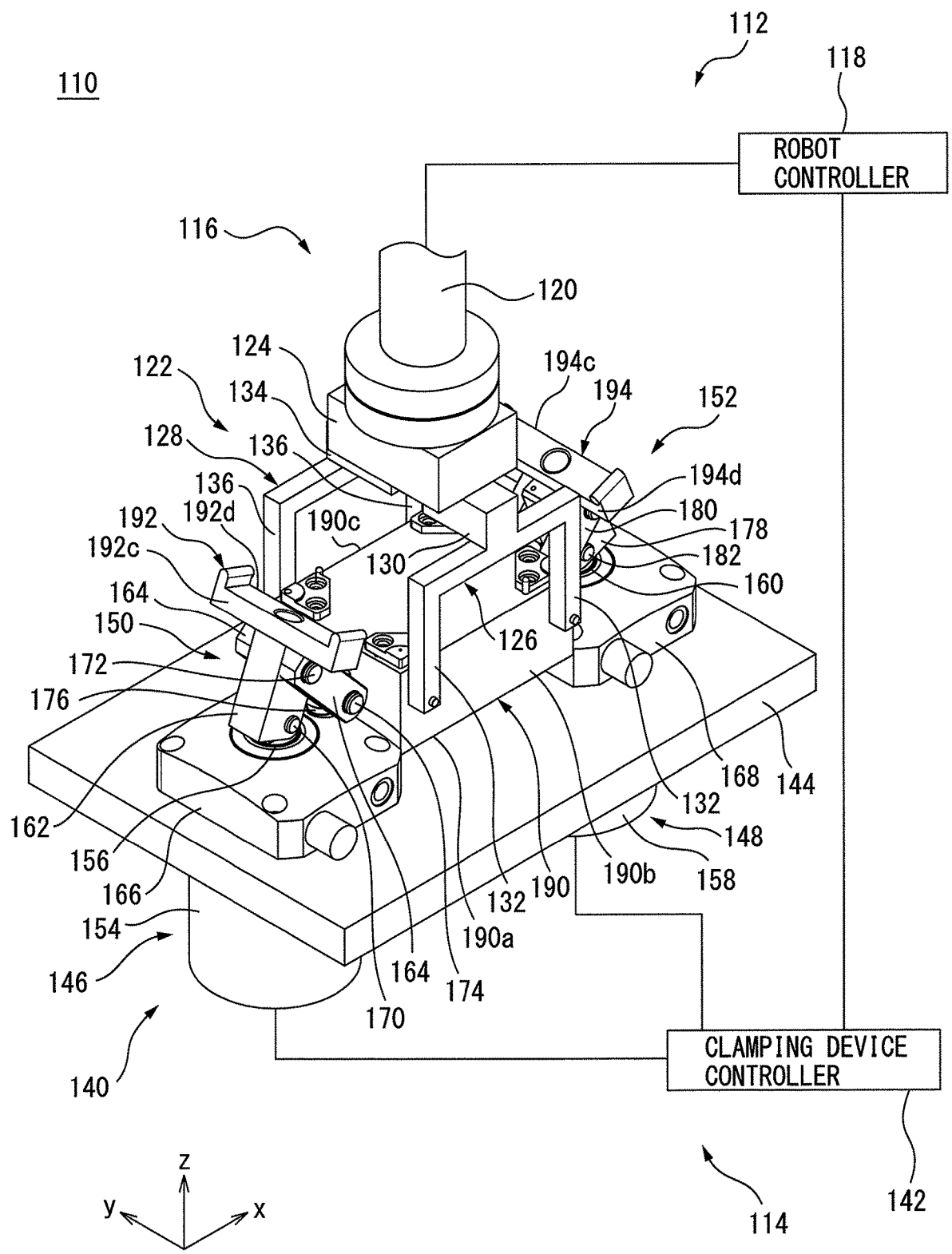
FIG. 12 is a perspective view of the processing system shown in FIG. 11.

Next, with reference to FIGS. 11 to 16, a processing system 110 according to another embodiment will be described. As shown in FIGS. 11 and 12, the processing system 110 includes a robot system 112 and a workpiece clamping system 114. The robot system 112 includes a robot 116 and a robot controller 118.

The robot 116 includes a manipulator 120 and a robot hand 122. The manipulator 120 includes servomotors or a pneumatic or hydraulic cylinder (not shown) therein, and moves the robot hand 122.

The robot hand 122 includes a hand base 124, a plurality of fingers 126 and 128 provided at the hand base 124 so as to open and close, and a finger drive part (not shown) configured to generate power to open and close the fingers 126 and 128. The finger drive part includes e.g. a servomotor or a pneumatic or hydraulic cylinder (not shown).

The finger 126 includes a proximal end part 130 and two fingertips 132 extending from the proximal end part 130 so as to branch from each other. Claws (not shown) are formed at tip ends of the respective fingertips 132 so as to project frontward.

The finger 128 is arranged at frontward of the finger 126. The finger 128 includes a proximal end part 134 and two fingertips 136 extending from the proximal end part 134 so as to branch from each other. Claws (not shown) are formed at tip ends of the respective fingertips 136 so as to project rearward.

The robot controller 118 transmits a command to each servomotor built in the manipulator 120 so as to operate the manipulator 120. Further, the robot controller 118 transmits a command to the finger drive part provided in the robot hand 122 so as to open and close the fingers 126 and 128.

The workpiece clamping system 114 includes a workpiece clamping device 140 and a clamping device controller 142.

The workpiece clamping device 140 includes a bracket 144, a first drive part 146, a second drive part 148, a first movable part 150, and a second movable part 152.

Figure 13:
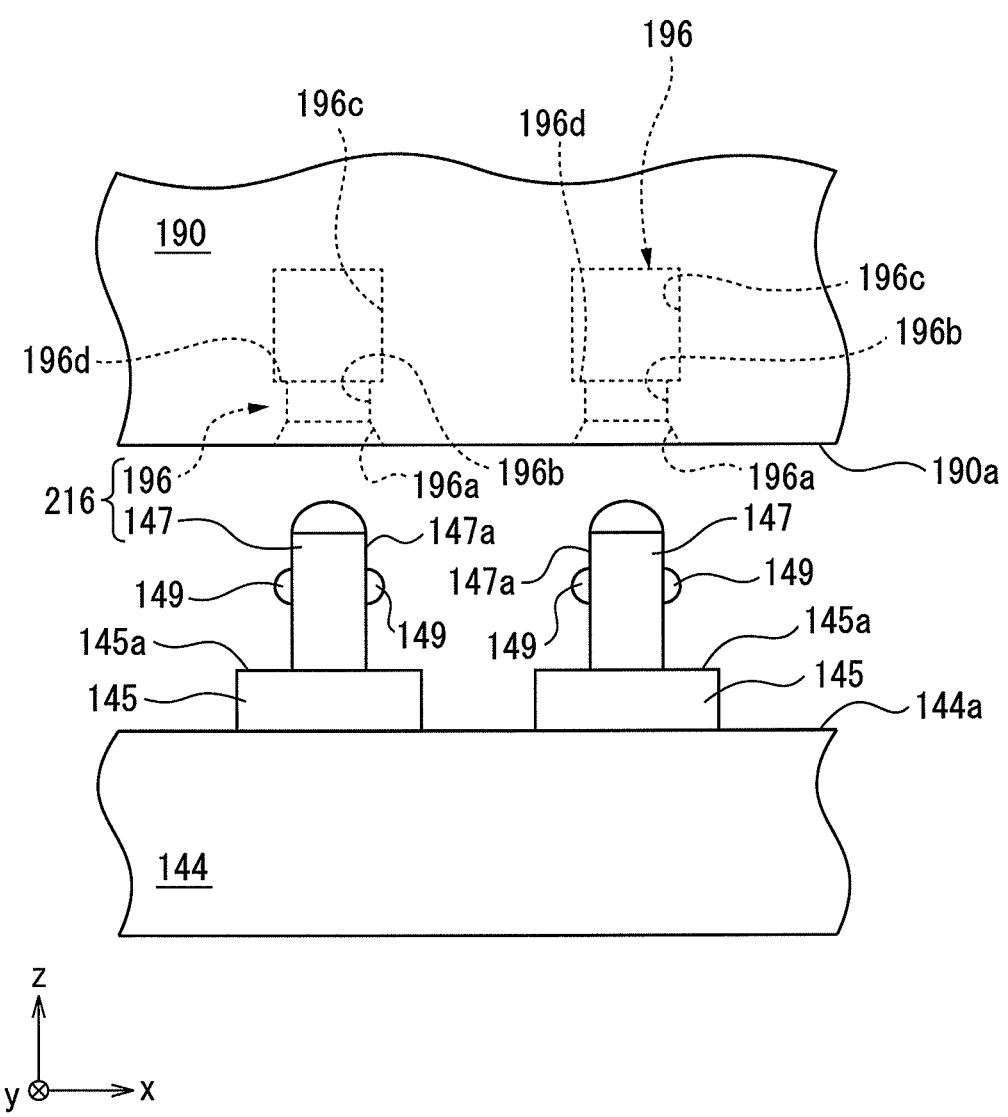
FIG. 13 shows a state where the first clamping member shown in FIG. 11 is separated upward from the bracket.

The bracket 144 is a flat-plate member arranged so as to be substantially parallel with x-y plane, and is fixed to a floor of a work cell. As shown in FIGS. 11 and 13, the bracket 144 includes a total of four columnar bosses 145 projecting upward from an upper end face 144a of the bracket 144. As shown in FIG. 13, a total of four coupling shafts 147 are respectively fixed to the upper end faces 145a of the bosses 145.

Each coupling shaft 147 is a substantially-columnar rod member, and extends upward from the corresponding upper end face 145a of the boss 145. A plurality of claws 149 are movably provided at each coupling shaft 147.

The claws 149 are respectively received in holes (not shown) formed to be recessed inward from an outer peripheral surface 147a of the coupling shaft 147. Each claw 149 can move in a radial direction of the coupling shaft 147 between a projection position, at which the claw 149 projects out from the outer peripheral surface 147a of the coupling shaft 147, and a retraction position, at which the claw 149 retracts inward from the outer peripheral surface 147a.

The claws 149 are biased toward radially outside of the coupling shaft 147 by a biasing part (not shown) provided at each coupling shaft 147. The biasing part includes e.g. spring arranged in the holes formed at each coupling shaft 147, or a pneumatic or hydraulic cylinder configured to advance and retract the claws 149 in accordance with a command from the clamping device controller 142.

The first drive part 146 is a hydraulic or pneumatic cylinder. Specifically, the drive part 146 includes a cylinder main body 154 fixed on the floor of the work cell, and a cylinder shaft 156 received in the cylinder main body 154 so as to advance and retract.

The cylinder main body 154 is a hollow member, and includes a piston (not shown) therein. The piston is coupled to the cylinder shaft 156, and is driven to move up and down in response to the pressure of a fluid (e.g., oil or compression gas) supplied from an external device (not shown) into the cylinder main body 154. Thus, the cylinder shaft 156 is moved up and down.

The second drive part 148 has configurations similar to the first drive part 146. Specifically, the second drive part 148 includes a cylinder main body 158 and a cylinder shaft 160 received in the cylinder main body 158 so as to advance and retract.

A total of two bosses 166 and 168 are fixedly provided at the bracket 144 so as to project upward from the upper end face 144a. The bosses 166 and 168 are respectively fixed to the cylinder main bodies 154 and 158 by fixing tools such as bolts.

As shown in FIGS. 11 and 12, the first movable part 150 includes a main arm 162, and a pair of auxiliary arms 164 arranged at front and rear sides of the main arm 162. A proximal end part of the main arm 162 is pivotally supported by the cylinder shaft 156 via a rotation shaft 170.

Figure 15:
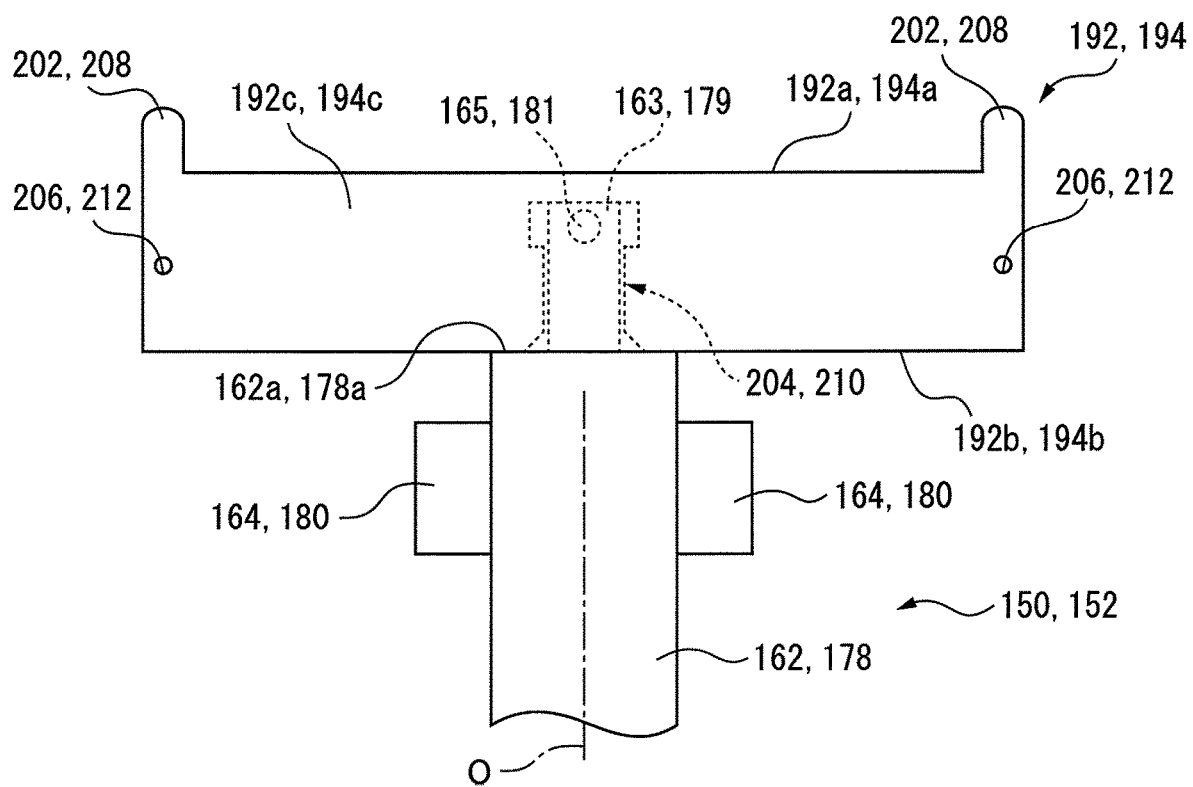
FIG. 15 is a view of the first and second movable parts in FIG. 11, as seen from the direction indicated by arrows XV in FIG. 11.
Figure 16:
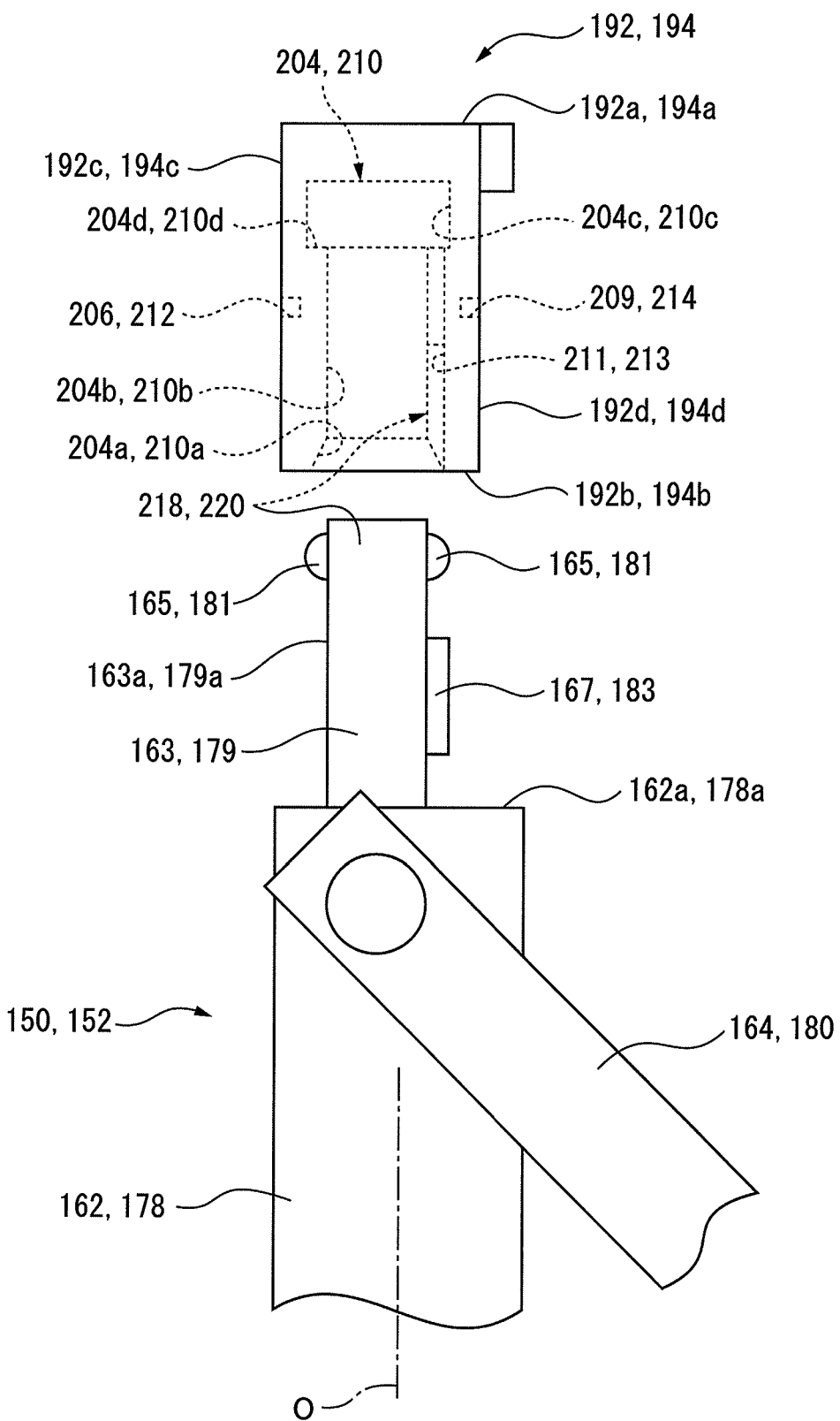
FIG. 16 is a view of the first and second movable parts in FIG. 11 as seen from the rear side and the front side respectively, and shows a state where the clamping members are separated away from the first and second movable parts respectively.

As shown in FIGS. 15 and 16, a coupling shaft 163 is fixedly provided at a distal end face 162a of the main arm 162. The coupling shaft 163 is a substantially-columnar rod member, and projects out from the distal end face 162a of the main arm 162 along an axis O of the main arm 162. A plurality of claws 165 are movably provided at the coupling shaft 163.

The claws 165 are respectively received in holes (not shown) formed at the coupling shaft 163 so as to be recessed inward from an outer peripheral surface 163a of the coupling shaft 163. Each claw 165 can move in a radial direction of the coupling shaft 163 between a projection position, at which the claw 165 projects out from the outer peripheral surface 163a, and a retraction position, at which the claw 165 retracts inward from the outer peripheral surface 163a.

The claws 165 are biased toward radially outside of the coupling shaft 163 by a biasing part (not shown) provided in the coupling shaft 163. The biasing part includes e.g. springs arranged in the holes formed at the coupling shaft 163, or a pneumatic or hydraulic cylinder configured to advance and retract the claws 165 in accordance with a command from the clamping device controller 142.

Further, the coupling shaft 163 includes a projection 167 (FIG. 16). The projection 167 is formed to project radially outward from the outer peripheral surface 163a of the coupling shaft 163, and extends in the direction of the axis O.

As shown in FIGS. 11 and 12, one end of each auxiliary arm 164 is pivotally supported by a distal end part of the main arm 162 via a rotation shaft 172, while the other end of each auxiliary arm 164 is pivotally supported by a protrusion 176 projecting upward from the boss 166 via a rotation shaft 174.

The second movable part 152 includes a main arm 178, and a pair of auxiliary arms 180 arranged at front and rear sides of the main arm 178. A proximal end part of the main arm 178 is pivotally supported by the cylinder shaft 160 via a rotation shaft 182.

As shown in FIGS. 15 and 16, a coupling shaft 179 is fixedly provided at a distal end face 178a of the main arm 178. The coupling shaft 179 is a substantially-columnar rod member, and projects from the distal end face 178a of the main arm 178 along an axis O of the main arm 178. A plurality of claws 181 are movably provided at the coupling shaft 179.

The claws 181 are respectively received in holes (not shown) formed at the coupling shaft 179 so as to be recessed inward from an outer peripheral surface 179a of the coupling shaft 179. Each claw 181 can move in a radial direction of the coupling shaft 179 between a projection position, at which the claw 181 projects out from the outer peripheral surface 179a, and a retraction position, at which the claw 181 retracts inward from the outer peripheral surface 179a.

The claws 181 are biased toward radially outside of the coupling shaft 179 by a biasing part (not shown) provided in the coupling shaft 179. The biasing part includes e.g. springs arranged in the holes formed at the coupling shaft 179, or a pneumatic or hydraulic cylinder configured to advance and retract the claws 181 in accordance with a command from the clamping device controller 142.

Further, the coupling shaft 179 includes a projection 183. The projection 183 projects radially outward from the outer peripheral surface 179a of the coupling shaft 179, and extends in the direction of the axis O.

As shown in FIGS. 11 and 12, one end of each auxiliary arm 180 is pivotally supported by the distal end part of the main arm 178 via a rotation shaft 184, while the other end of each auxiliary arm 180 is pivotally supported by a protrusion 188 projecting upward from the boss 168 via a rotation shaft 186.

The workpiece clamping device 140 further includes clamping members 190, 192 and 194.

As shown in FIG. 13, a total of four holes 196 are formed at the clamping member 190 so as to be recessed upward from a bottom end face 190a of the clamping member 190. The holes 196 have circular outer shapes, and can slidably receive the coupling shafts 147, respectively.

More specifically, each of the holes 196 includes a first hole part 196a, a second hole part 196b, and a third hole part 196c. The first hole part 196a is defined by a tapered surface having a diameter gradually increasing toward the lower side.

The second hole part 196b has a diameter substantially the same as that of the upper end of the tapered surface defining the first hole part 196a. The third hole part 196c has a diameter larger than that of the second hole part 196b, wherein a stepped portion 196d is formed at a connection between the second hole part 196b and the third hole part 196c.

Figure 14:
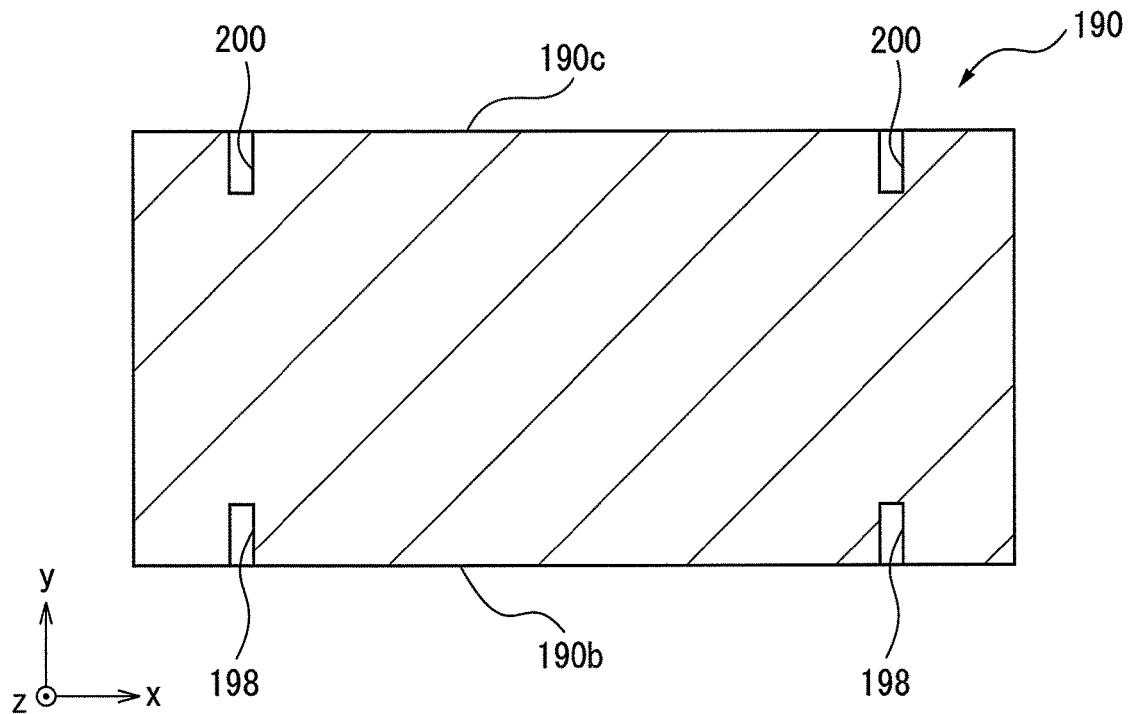
FIG. 14 is a cross-sectional view of the first clamping member shown in FIG. 11, cut along x-y plane in FIG. 11.

As shown in FIG. 14, a total of two claw-receiving holes 198 are formed at the clamping member 190 so as to be recessed frontward from a rear end face 190b of the clamping member 190. The claw-receiving holes 198 can respectively receive the claws provided at the tip ends of the fingertips 132 of the robot hand 122.

Further, a total of two claw-receiving holes 200 are formed at the clamping member 190 so as to be recessed rearward from a front end face 190c of the clamping member 190. The claw-receiving holes 200 can respectively receive the claws provided at the tip ends of the fingertips 136 of the robot hand 122.

As shown in FIGS. 15 and 16, the clamping member 192 includes a pair of clamping claws 202 projecting out from a distal end face 192a of the clamping member 192.

Further, the clamping member 192 is formed with a hole 204 recessed inward a proximal end face 192b of the clamping member 192. The hole 204 has a circular outer shape, and slidably receives the coupling shaft 163 provided at the main arm 162.

More specifically, the hole 204 includes a first hole part 204a, a second hole part 204b, and a third hole part 204c. The first hole part 204a is defined by a tapered surface having a diameter gradually increasing toward the proximal end face 192b.

The second hole part 204b has a diameter substantially the same as that of the distal end of the tapered surface defining the first hole part 204a. The third hole part 204c has a diameter larger than that of the second hole part 204b, wherein a stepped portion 204d is formed at a connection between the second hole part 204b and the third hole part 204c.

Further, the clamping member 192 is formed with a notch 211 recessed inward from the wall surfaces defining the first and second hole parts 204a and 204b. The notch 211 is arranged at a predetermined position in a circumferential direction of the hole 204, and extends in the direction of the axis O.

The notch 211 slidably receives the projection 167 formed at the coupling shaft 163, and engages the projection 167. Due to this, it is possible to prevent the clamping member 192 from rotating in the circumferential direction with respect to the coupling shaft 163.

Further, the clamping member 192 is formed with a total of two claw-receiving holes 206 recessed inward from a top end face 192c of the clamping member 192. The claw-receiving holes 206 can respectively receive the claws provided at the tip ends of the fingertips 132 of the robot hand 122.

Similarly, the clamping member 192 is formed with a total of two claw-receiving holes 209 recessed inward from a bottom end face 192d of the clamping member 192. The claw-receiving holes 209 can respectively receive the claws provided at the tip ends of the fingertips 136 of the robot hand 122.

The clamping member 194 has configurations similar to the clamping member 192. Specifically, the clamping member 194 includes a pair of clamping claws 208 projecting out from a distal end face 194a of the clamping member 194.

The clamping member 194 is formed with a hole 210 recessed inward from a proximal end face 194b of the clamping member 194. The hole 210 has a circular outer shape, and slidably receives the coupling shaft 179 provided at the main arm 178.

More specifically, the hole 210 includes a first hole part 210a, a second hole part 210b, and a third hole part 210c. The first hole part 210a is defined by a tapered surface having a diameter gradually increasing toward the proximal end face 194b.

The second hole part 210b has a diameter substantially the same as that of the distal end of the tapered surface defining the first hole part 210a. The third hole part 210c has a diameter larger than that of the second hole part 210b, wherein a stepped portion 210d is formed at a connection between the second hole part 210b and the third hole part 210c.

The clamping member 194 is formed with a notch 213 recessed inward from wall surfaces defining the first hole part 210a and the second hole part 210b. The notch 213 is arranged at a predetermined position in the circumferential direction of the hole 210, and extends in the direction of the axis O.

The notch 213 receives the projection 183 formed at the coupling shaft 179, and engages the projection 183. Due to this, it is possible to prevent the clamping member 194 from rotating in the circumferential direction with respect to the coupling shaft 179.

Further, the clamping member 194 is formed with a total of two claw-receiving holes 212 recessed inward from a top end face 194c of the clamping member 194. The claw-receiving holes 212 can respectively receive the claws provided at the tip ends of the fingertips 132 of the robot hand 122.

Similarly, the clamping member 194 is formed with a total of two claw-receiving holes 214 recessed inward from a bottom end face 194d of the clamping member 194. The claw-receiving holes 214 can respectively receive the claws provided at the tip ends of the fingertips 136 of the robot hand 122.

The clamping device controller 142 controls the drive parts 146 and 148. Specifically, the clamping device controller 142 transmits commands to the drive parts 146 and 148 so as to move the cylinder shafts 156 and 160 up and down.

In this embodiment, the robot controller 118 and the clamping device controller 142 are communicably connected to each other. The robot controller 118 and the clamping device controller 142 carry out a process of changing the clamping members 190 and 192, along with communicating each other. This process will be described later.

Next, with reference to FIGS. 17 and 18, the operation of the workpiece clamping device 140 according to this embodiment to clamp a workpiece W will be described. First, the workpiece W is placed on the clamping member 190.

Then, the clamping device controller 142 operates the first drive part 146 and the second drive part 148 so as to push the cylinder shafts 156 and 160 upward. Due to this, the proximal end parts of the main arms 162 and 178 are moved upward.

On the other hand, the distal end parts of the main arms 162 and 178 are pivotally supported by the auxiliary arms 164 and 180 respectively. Therefore, the distal end parts of the main arms 162 and 178 are guided by the auxiliary arms 164 and 180 so as to rotate around the rotation shaft 174. In this way, the upward movement of the cylinder shafts 156 and 160 is converted to the rotational movement of the main arms 162 and 178 around the rotation shaft 174.

Figure 17:
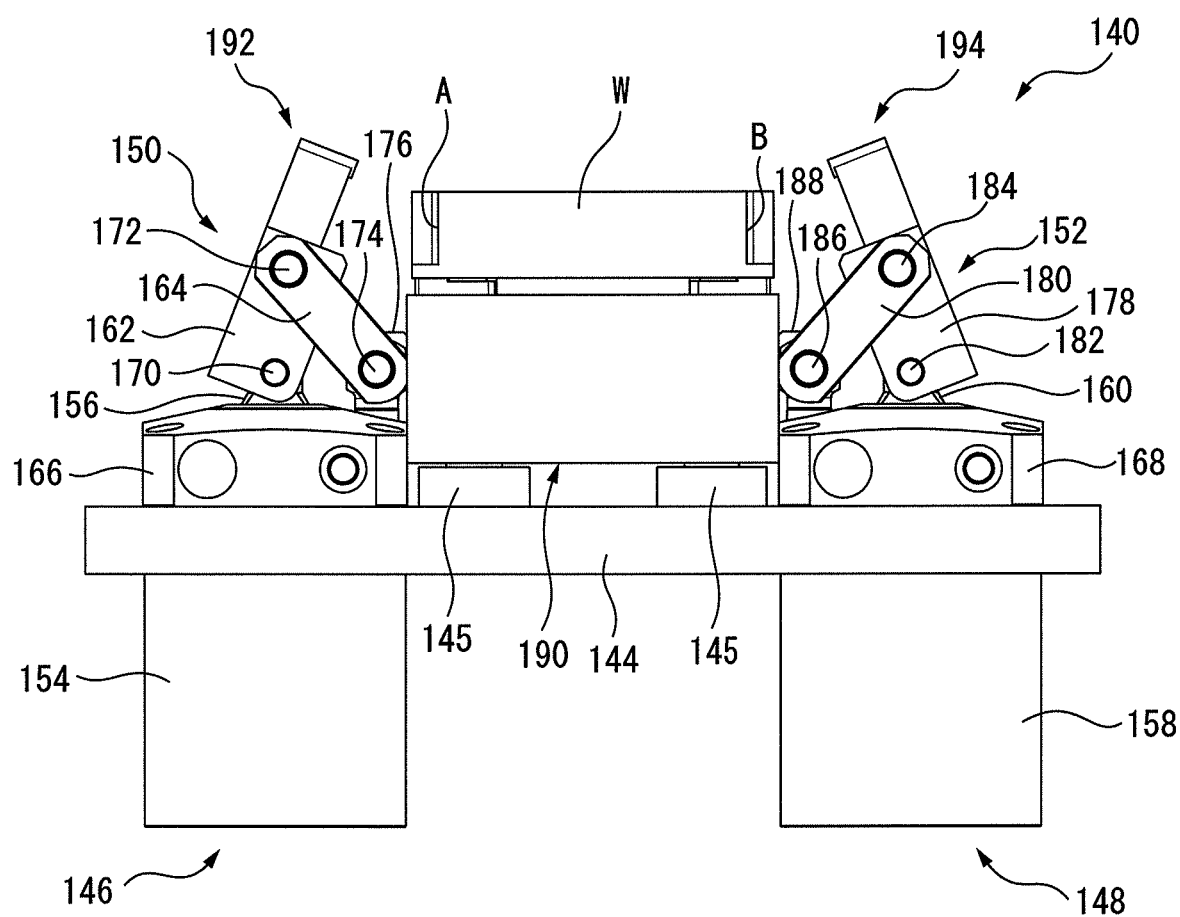
FIG. 17 is a view for explaining the operation of the workpiece clamping device shown in FIG. 11 when it clamps the workpiece.
Figure 18:
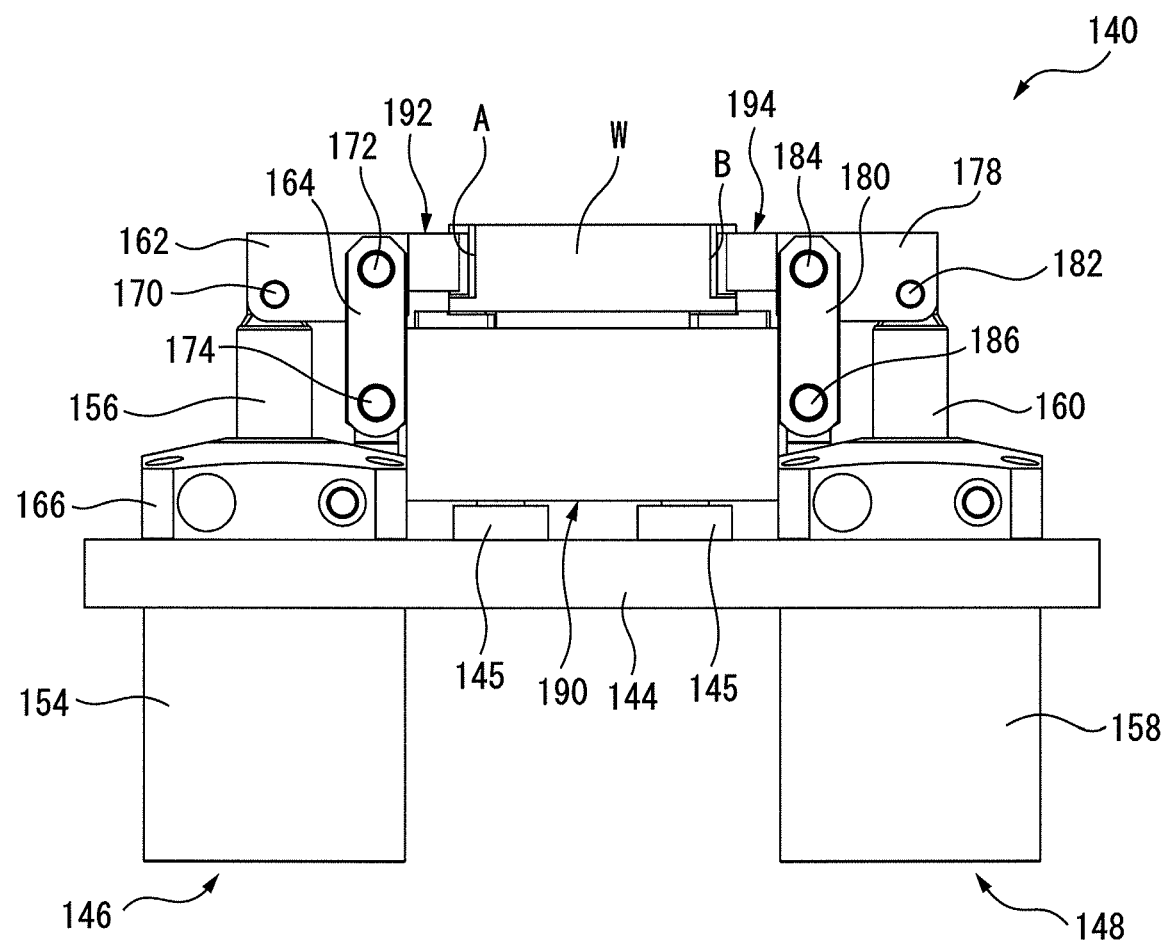
FIG. 18 is a view for explaining the operation of the workpiece clamping device shown in FIG. 11 when it clamps the workpiece.

As a result, the clamping members 192 and 194 are moved from the position shown in FIG. 17 to the position shown in FIG. 18, thereby, the clamping claws 202 and 208 (FIG. 15) provided at the clamping members 192 and 194 respectively engage the claw-receiving parts A and B formed at the workpiece W. Thus, the workpiece W is clamped between the clamping member 190 and the clamping members 192 and 194.

Next, with reference to FIGS. 19 to 23, the operation of the processing system 110 will be described. In order to process a plurality of types of workpieces, the processing system 110 changes the clamping members 190, 192 and 194 by the robot 116, in response to the type of workpiece to be processed.

Figure 19:
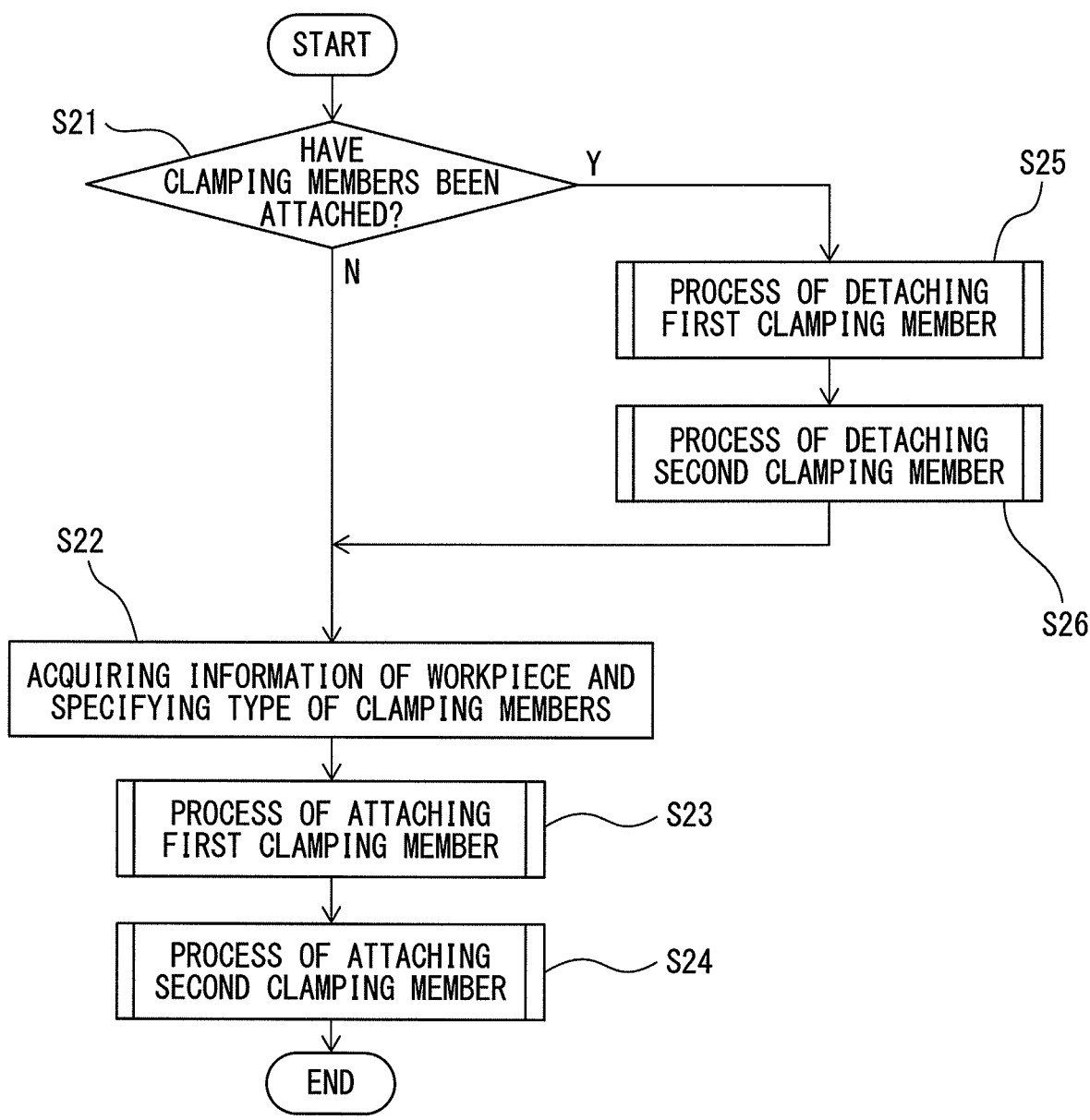
FIG. 19 is a flowchart of an example of the operation flow of the processing system shown in FIG. 11.
Figure 20:
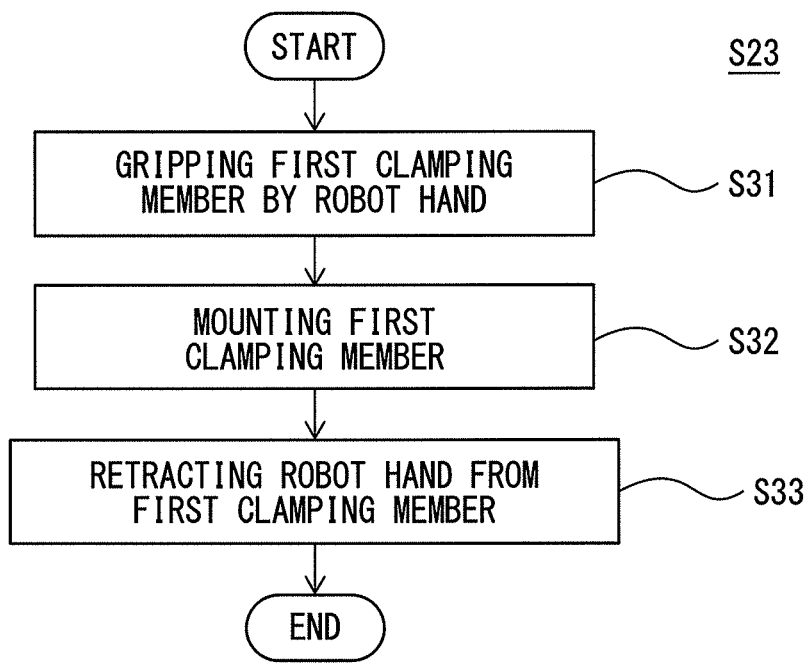
FIG. 20 is a flowchart of an example of the flow of step S23 in FIG. 19.
Figure 21:
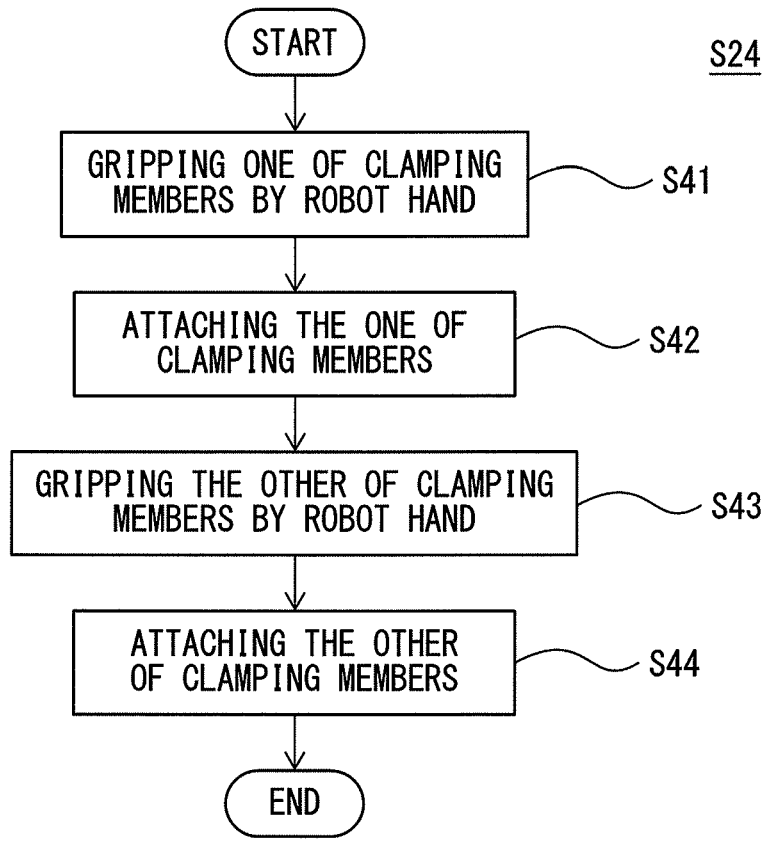
FIG. 21 is a flowchart of an example of the flow of step S24 in FIG. 19.

The flow shown in FIG. 19 is started when the robot controller 118 or the clamping device controller 142 receives a command for changing the clamping members 190, 192 and 194 from a user, a host controller, or a processing program.

At step S21, the robot controller 118 or the clamping device controller 142 determines whether the clamping members 190, 192 and 194 are attached to the bracket 144, the movable part 150, and the movable part 152.

For example, the robot controller 118 or the clamping device controller 142 determines whether the clamping members 190, 192 and 194 are attached based on an input signal from a user or the processing program.

When the robot controller 118 or the clamping device controller 142 determines that the clamping members 190, 192 and 194 are attached (i.e., determines "YES"), it proceeds to step S25.

On the other hand, when the robot controller 118 or the clamping device controller 142 determines that the clamping members 190, 192 and 194 are not attached (i.e., determines "NO"), it proceeds to step S22.

At step S22, the robot controller 118 or the clamping device controller 142 acquires information of a workpiece to be processed next, and specifies the type of clamp members for clamping the workpiece to be processed.

Below, a case is described in which the robot controller 118 or the clamping device controller 142 specifies the clamping members 190, 192 and 194 shown in FIGS. 11 and 12 at this step S22.

At step S23, the robot controller 118 carries out a process of attaching the clamping member 190. This step S23 will be described with reference to FIG. 20.

At step S31, the robot controller 118 causes the robot hand 122 to grip the clamping member 190 stored in a predetermined place.

Specifically, the robot controller 118 transmits a command to each servomotor built in the manipulator 120 in accordance with the robot program, so as to move the robot hand 122 to the position of the clamping member 190 stored in the predetermined place.

At this time, the claws provided at the tip ends of the fingertips 132 of the robot hand 122 are respectively positioned at the claw-receiving holes 198 formed at the rear end face 190*b* of the clamping member 190, while the claws provided at the tip ends of the fingertips 136 of the robot hand 122 are respectively positioned at the claw-receiving holes 200 formed at the front end face 190*c* of the clamping member 190.

Next, the robot controller 118 transmits a command to the finger drive part provided in the robot hand 122 so as to close the fingers 126 and 128 of the robot hand 122. As a result, the claws provided at the tip ends of the finger 126 of the robot hand 122 are respectively received in the claw-receiving holes 198, and engage the claw-receiving holes 198.

Further, the claws provided at the tip ends of the finger 128 of the robot hand 122 are respectively received in the claw-receiving holes 200, and engage the claw-receiving holes 200. In this way, the robot hand 122 grips the clamping member 190 stored in the predetermined place.

At step S32, the robot controller 118 mounts the clamping member 190 on the bracket 144. Specifically, the robot controller 118 operates the manipulator 120 in accordance with the robot program so as to position the clamping member 190, which has been gripped by the robot hand 122 at step S31, upward of the bracket 144.

At this time, the clamping member 190 is positioned upward of the bracket 144 so that the holes 196 formed at the bottom end face 190*a* of the clamping member 190 are respectively positioned upward of the coupling shafts 147 provided at the bracket 144.

Then, the robot controller 118 operates the manipulator 120 so as to move the clamping member 190 downward. As a result, the coupling shafts 147 provided at the bracket 144 are respectively inserted into the holes 196 provided at the bottom end face 190*a* of the clamping member 190.

In an example in which the biasing part for biasing the claws 149 is comprised of the springs, when the coupling shafts 147 are inserted into the holes 196, the claws 149 provided at each coupling shaft 147 are displaced to the retraction position during they pass the second hole part 196*b*, and returned to the projection position when they reach the third hole part 196*c*, thereby they engage the stepped portion 196*d*.

In another example in which the biasing part for biasing the claws 149 is comprised of the cylinder, the clamping device controller 142 transmits a command to the biasing part so as to retract the claws 149 to the retraction position, before the clamping member 190 is moved downward at this step S32.

Subsequently, when the clamping member 190 are moved downward and the claws 149 pass the second hole part 196*b* and reach the third hole part 196*c*, the clamping device controller 142 transmits a command to the biasing part so as to push the claws 149 to the projection position. Due to this, the claws 149 engage the stepped portion 196*d*.

In this way, the clamping member 190 is mounted on the bracket 144 as shown in FIGS. 11 and 12.

At step S33, the robot controller 118 causes the robot hand 122 to release the clamping member 190, and retracts the robot hand 122 from the clamping member 190.

Specifically, the robot controller 118 transmits a command to the finger drive part provided in the robot hand 122 so as to open the fingers 126 and 128 of the robot hand 122. Then, the robot controller 118 operates the manipulator 120 so as to move the robot hand 122 away from the clamping member 190.

Referring again to FIG. 19, at step S24, the robot controller 118 carries out a process of attaching the clamping members 192 and 194. This step S24 will be described with reference to FIG. 21.

At step S41, the robot controller 118 causes the robot hand 122 to grip the clamping member 192 stored in a predetermined place. Specifically, the robot controller 118 operates the manipulator 120 in accordance with the robot program so as to move the robot hand 122 to the position of the clamping member 192 stored in the predetermined place.

At this time, the claws provided at the tip ends of the fingertips 132 of the robot hand 122 are positioned so as to face the claw-receiving holes 206 formed at the top end face 192*c* of the clamping member 192, respectively.

Further, the claws provided at the tip ends of the fingertips 136 of the robot hand 122 are positioned so as to face the claw-receiving holes 209 formed at the bottom end face 192*d* of the clamping member 192, respectively.

Then, the robot controller 118 transmits a command to the finger drive part provided in the robot hand 122 so as to close the fingers 126 and 128 of the robot hand 122. As a result, the claws provided at the tip ends of the finger 126 of the robot hand 122 are respectively received in the claw-receiving holes 206, and engage the claw-receiving holes 206.

Further, the claws provided at the tip ends of the finger 128 of the robot hand 122 are respectively received in the claw-receiving holes 209, and engage the claw-receiving holes 209. In this way, the robot hand 122 grips the clamping member 192 stored in the predetermined place.

At step S42, the robot controller 118 attaches the clamping member 192 to the first movable part 150. Specifically, the robot controller 118 operates the manipulator 120 in accordance with the robot program so as to position the clamping member 192, which has been gripped by the robot hand 122 at step S41, with respect to the first movable part 150, as shown in FIG. 16.

At this time, the proximal end face 192*b* of the clamping member 192 faces the distal end face 162*a* of the main arm 162. In addition, the coupling shaft 163 and the hole 204 are concentrically arranged, and the position of the projection 167 in the circumferential direction coincides with the position of the notch 211 in the circumferential direction.

Then, the robot controller 118 operates the manipulator 120 so as to move the clamping member 192 toward the main arm 162 along the axis O. Consequently, the coupling shaft 163 provided at the main arm 162 is inserted into the hole 204 provided at the clamping member 192.

In an example in which the biasing part for biasing the claws 165 is comprised of the springs, when the coupling shaft 163 is inserted into the hole 204, the claws 165 provided at the coupling shaft 163 are displaced to the retraction position during they pass the second hole part 204*b*, and returned to the projection position when they reach the third hole part 204*c*, thereby they engage the stepped portion 204*d*.

In another example in which the biasing part for biasing the claws 165 is comprised of the cylinder, the clamping device controller 142 transmits a command to the biasing part so as to retract the claws 165 to the retraction position, before the clamping member 192 is moved toward the main arm 162 at this step S42.

Subsequently, when the clamping member 192 is moved toward the main arm 162 and the claws 165 pass the second hole part 204*b* and reach the third hole part 204*c*, the clamping device controller 142 transmits a command to the biasing part so as to push the claws 165 to the projection position. Due to this, the claws 165 engage the stepped portion 204d.

Further, the projection 167 provided at the coupling shaft 163 is received in the notch 211, and engage the notch 211. Thus, the clamping member 192 is attached to the first movable part 150 as shown in FIGS. 11, 12, and 15.

At step S43, the robot controller 118 causes the robot hand 122 to grip the clamping member 194 stored in a predetermined place. Specifically, the robot controller 118 operates the manipulator 120 in accordance with the robot program so as to move the robot hand 122 to the position of the clamping member 194 stored in the predetermined place.

At this time, the claws provided at the tip ends of the fingertips 132 of the robot hand 122 are positioned so as to face the claw-receiving holes 212 formed at the top end face 194c of the clamping member 194, respectively.

Further, the claws provided at the tip ends of the fingertips 136 of the robot hand 122 are positioned so as to face the claw-receiving holes 214 formed at the bottom end face 194d of the clamping member 194, respectively.

Then, the robot controller 118 transmits a command to the finger drive part provided in the robot hand 122 so as to close the fingers 126 and 128 of the robot hand 22. As a result, the claws provided at the tip ends of the fingertips 132 of the robot hand 122 are respectively received in the claw-receiving holes 212, and engage the claw-receiving holes 212.

Further, the claws provided at the tip ends of the fingertips 136 of the robot hand 122 are respectively received in the claw-receiving holes 214, and engage the claw-receiving holes 214. In this way, the robot hand 122 grips the clamping member 194 stored in the predetermined place.

At step S44, the robot controller 118 attaches the clamping member 194 to the second movable part 152. Specifically, the robot controller 118 operates the manipulator 120 in accordance with the robot program so as to position the clamping member 194, which has been gripped by the robot hand 122 at step S43, with respect to the second movable part 152, as shown in FIG. 16.

At this time, the proximal end face 194b of the clamping member 194 faces the distal end face 178a of the main arm 178. In addition, the coupling shaft 179 and the hole 210 are concentrically arranged, and the position of the projection 183 in the circumferential direction coincides with the position of the notch 213 in the circumferential direction.

Then, the robot controller 118 operates the manipulator 120 so as to move the clamping member 194 toward the main arm 178 along the axis O. Consequently, the coupling shaft 179 provided at the main arm 178 is inserted into the hole 210 provided at the clamping member 194.

When the coupling shaft 179 is inserted into the hole 210, by the action of the biasing part, the claws 181 provided at the coupling shaft 179 are arranged at the retraction position during they pass the second hole part 210b, and pushed to the projection position when they reach the third hole part 210c so as to engage the stepped portion 210d, similarly as the above-mentioned claws 165.

Further, the projection 183 provided at the coupling shaft 179 is received in the notch 213, and engage the notch 213. In this way, the clamping member 194 is attached to the second movable part 152 as shown in FIGS. 11, 12, and 15.

After step S24, the robot controller 118 or the clamping device controller 142 ends the flow shown in FIG. 19.

On the other hand, when it is determined "YES" at step S21, at step S25, the robot controller 118 carries out a process of detaching the clamping member attached to the bracket 144.

Below, a case is described in which the clamping members 190, 192 and 194 shown in FIGS. 11 and 12 are respectively attached to the bracket 144, the first movable part 150, and the second movable part 152 when it is determined "YES" at step S21.

Figure 22:
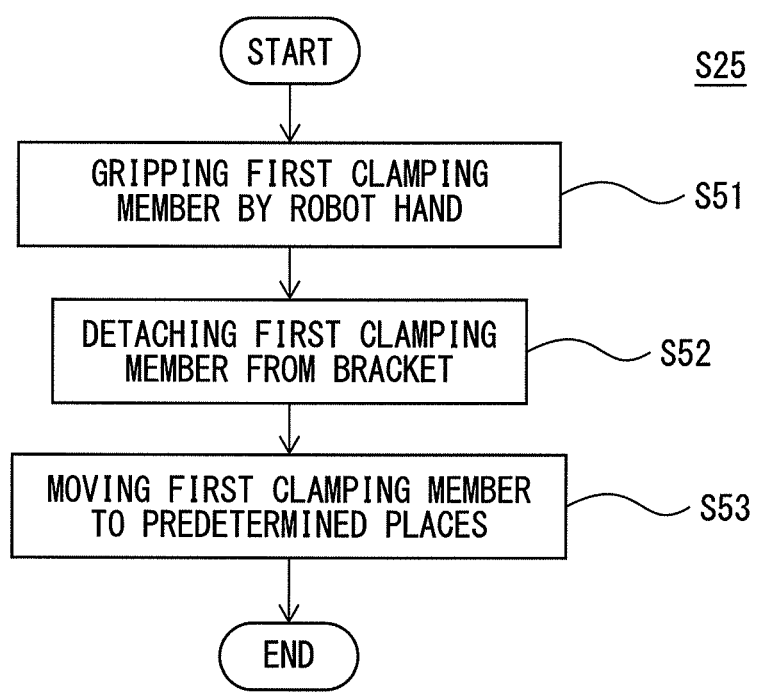
FIG. 22 is a flowchart of an example of the flow of step S25 in FIG. 19.
Figure 23:
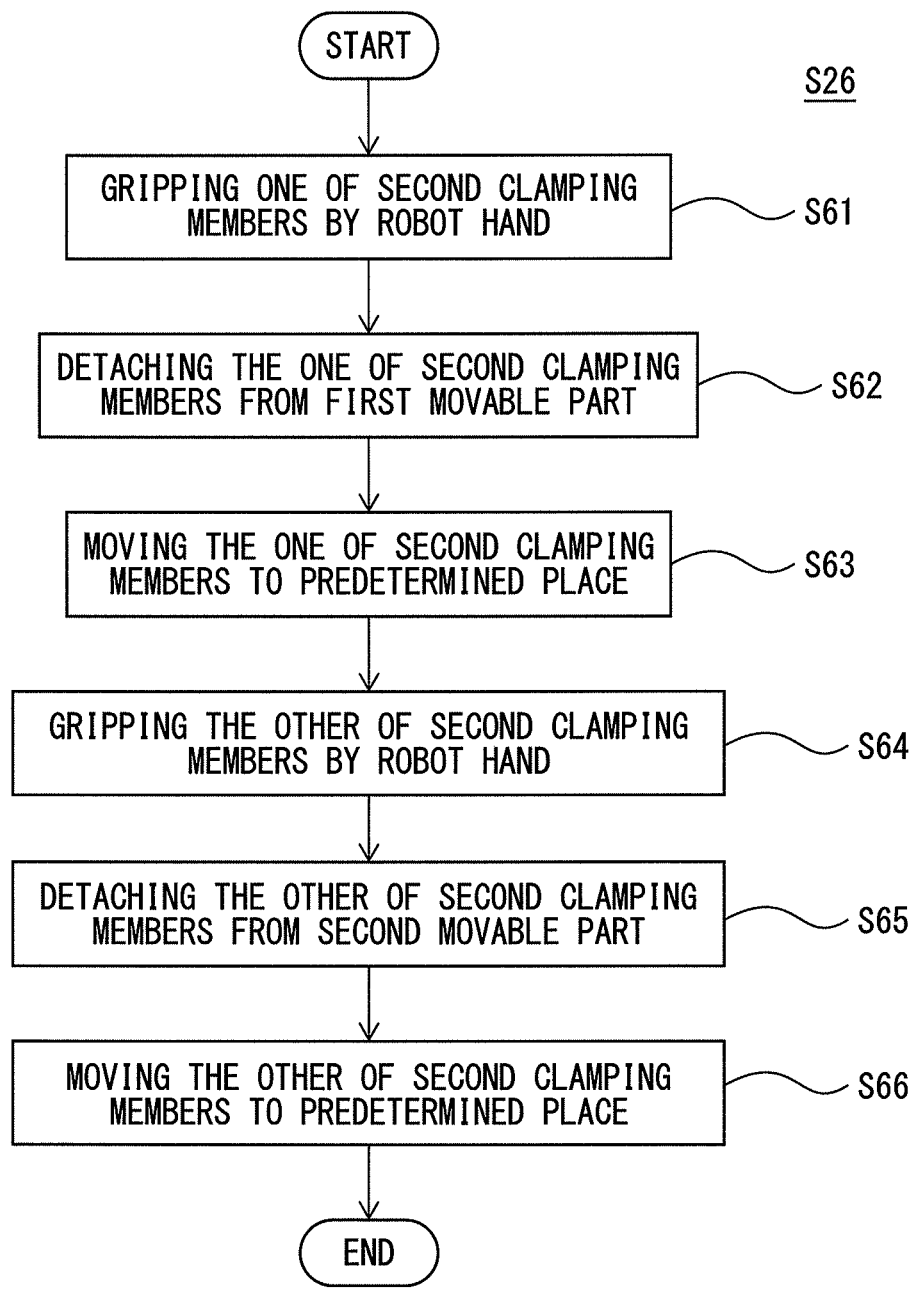
FIG. 23 is a flowchart of an example of the flow of step S26 in FIG. 19.

This step S25 will be described with reference to FIG. 22. At step S51, the robot controller 118 causes the robot hand 122 to grip the clamping member 190 mounted on the bracket 144.

Specifically, the robot controller 118 operates the manipulator 120 in accordance with the robot program so as to move the robot hand 122 to the position of the clamping member 190 mounted on the bracket 144.

At this time, the claws provided at the tip ends of the fingertips 132 of the robot hand 122 are respectively positioned at the claw-receiving holes 198 formed at the rear end face 190b of the clamping member 190. Further, the claws provided at the tip ends of the fingertips 136 of the robot hand 122 are respectively positioned at the claw-receiving holes 200 formed at the front end face 190c of the clamping member 190.

Then, the robot controller 118 transmits a command to the finger drive part provided in the robot hand 122 so as to close the fingers 126 and 128 of the robot hand 122. As a result, the claws provided at the tip ends of the fingertips 132 of the robot hand 122 are respectively received in the claw-receiving holes 198, and engage the claw-receiving holes 198.

Further, the claws provided at the tip ends of the fingertips 136 of the robot hand 122 are respectively received in the claw-receiving holes 200, and engage the claw-receiving holes 200. Thus, the clamping member 190 is gripped by the robot hand 122 as shown in FIGS. 11 and 12.

At step S52, the robot controller 118 detaches the clamping member 190 from the bracket 144. Specifically, the robot controller 118 operates the manipulator 120 so as to upwardly move the clamping member 190 which has been gripped by the robot hand 122 at step S51.

Due to this, the coupling shafts 147 provided at the bracket 144 are pulled out from the holes 196 provided at the clamping member 190.

In an example in which the biasing part for biasing the claws 149 is comprised of the springs, when the coupling shafts 147 are pulled out from the holes 196, the claws 149 provided at the coupling shafts 147 are displaced to the retraction position during they pass the second hole part 196b.

In another example in which the biasing part for biasing the claws 149 is comprised of the cylinder, the clamping device controller 142 transmits a command to the biasing part so as to retract the claws 149 to the retraction position, before the clamping member 190 is moved upward at this step S52.

Thereby, the claws 149 can pass the second hole part 196b when the clamping member 190 is moved upward at this step S52. In this way, the clamping member 190 is detached from the bracket 144.

At step S53, the robot controller 118 operates the manipulator 120 in accordance with the robot program so as to transfer the clamping member 190 gripped by the robot hand 122 to a predetermined place, and places it there.

Referring again to FIG. 19, at step S26, the robot controller 118 carries out a process of detaching the clamping members 192 and 194 attached to the first movable part 150 and the second movable part 152. This step S26 will be described with reference to FIG. 23.

At step S61, the robot controller 118 causes the robot hand 122 to grip the clamping member 192 attached to the first movable part 150.

Specifically, the robot controller 118 transmits a command to each servomotor built in the manipulator 120 in accordance with the robot program, so as to move the robot hand 122 to the position of the clamping member 192 attached to the first movable part 150.

At this time, the claws provided at the tip ends of the fingertips 132 of the robot hand 122 are positioned so as to face the respective claw-receiving holes 206 formed at the top end face 192c of the clamping member 192.

On the other hand, the claws provided at the tip ends of the fingertips 136 of the robot hand 122 are positioned so as to face the respective claw-receiving holes 209 formed at the bottom end face 192d of the clamping member 192.

Next, the robot controller 118 transmits a command to the finger drive part provided in the robot hand 122 so as to close the fingers 126 and 128 of the robot hand 122. Consequently, the claws provided at the tip ends of the fingertips 132 of the robot hand 122 are respectively received in the claw-receiving holes 206, and engage the claw-receiving holes 206.

Further, the claws provided at the tip ends of the fingertips 136 of the robot hand 122 are respectively received in the claw-receiving holes 209, and engage the claw-receiving holes 209. Thus, the robot hand 122 grips the clamping member 192.

At step S62, the robot controller 118 detaches the clamping member 192 from the first movable part 150. Specifically, the robot controller 118 operates the manipulator 120 so as to move the clamping member 192, which has been gripped by the robot hand 122 at step S61, away from the main arm 162 along the axis O.

Due to this, the coupling shaft 163 provided at the main arm 162 is pulled out from the hole 204 provided at the clamping member 192.

In an example in which the biasing part for biasing the claws 165 is comprised of the springs, when the coupling shaft 163 is pulled out from the hole 204 at this step S62, the claws 165 provided at the coupling shaft 163 is displaced to the retraction position during they pass the second hole part 204b.

In another example in which the biasing part for biasing the claws 165 is comprised of the cylinder, the clamping device controller 142 transmits a command to the biasing part so as to retract the claws 165 to the retraction position, before the clamping member 192 is moved away from the main arm 162 at this step S62.

Thereby, the claws 165 can pass second hole part 204b when the clamping member 192 is moved away from the main arm 162 at this step S62. Thus, the clamping member 192 is detached from the first movable part 150 as shown in FIG. 16.

At step S63, the robot controller 118 transports the clamping member 192 gripped by the robot hand 122 to a predetermined place, and places it there.

At step S64, the robot controller 118 causes the robot hand 122 to grip the clamping member 194 attached to the second movable part 152.

Specifically, the robot controller 118 transmits a command to each servomotor built in the manipulator 120 in accordance with the robot program, so as to move the robot hand 122 to the position of the clamping member 194 attached to the second movable part 152.

At this time, the claws provided at the tip ends of the fingertips 132 of the robot hand 122 are positioned so as to face the respective claw-receiving holes 212 formed at the top end face 194c of the clamping member 194.

Further, the claws provided at the tip ends of the fingertips 136 of the robot hand 122 are positioned so as to face the respective claw-receiving holes 214 formed at the bottom end face 194d of the clamping member 194.

Then, the robot controller 118 transmits a command to the finger drive part provided in the robot hand 122 so as to close the fingers 126 and 128 of the robot hand 122. Consequently, the claws provided at the tip ends of the fingertips 132 of the robot hand 122 are respectively received in the claw-receiving holes 212, and engage the claw-receiving holes 212.

Further, the claws provided at the tip ends of the fingertips 136 of the robot hand 122 are respectively received in the claw-receiving holes 214, and engage the claw-receiving holes 214. Thus, the robot hand 122 grips the clamping member 194.

At step S65, the robot controller 118 detaches the clamping member 194 from the second movable part 152. Specifically, the robot controller 118 operates the manipulator 120 so as to move the clamping member 194, which has been gripped by the robot hand 122 at step S64, away from the main arm 178 along the axis O.

Due to this, the coupling shaft 179 provided at the main arm 178 is pulled out from the hole 210 provided at the clamping member 194. When the coupling shaft 179 is pulled out from the hole 210, by the action of the biasing part, the claws 181 provided at the coupling shaft 179 are arranged at the retraction position during they pass the second hole part 210b, similarly as the above-mentioned claws 165. In this way, the clamping member 194 is detached from the second movable part 152 as shown in FIG. 16.

At step S66, the robot controller 118 transports the clamping member 194 gripped by the robot hand 122 to a predetermined place, and places it there.

After step S26, the robot controller 118 or the clamping device controller 142 carries out steps S22 to S24 shown in FIG. 19, and attaches another clamping members corresponding to the type of a workpiece to be processed next to the bracket 144, the first movable part 150, and the second movable part 152, respectively.

In this embodiment, the clamping member 190 and the bracket 144 can be attached to and detached from each other in the up-down direction, by the coupling shafts 147 and the holes 196 slidably receiving the coupling shafts 147. Therefore, the coupling shafts 147 and the holes 196 constitute a detachable device 216 (FIG. 13) configured to detachably connect the bracket 144 and the clamping member 190 with each other.

Further, the clamping member 192 and the first movable part 150 can be attached to and detached from each other in the direction of the axis O, by the coupling shaft 163 and the hole 204 slidably receiving the coupling shaft 163. Therefore, the coupling shaft 163 and the hole 204 constitute a detachable device 218 (FIG. 16) configured to detachably couple the first movable part 150 and the clamping member 192 with each other.

Similarly, the clamping member 194 and the second movable part 152 can be attached to and detached from each other in the direction of the axis O, by the coupling shaft 179 and the hole 210 slidably receiving the coupling shaft 179.

Therefore, the coupling shaft 179 and the hole 210 constitute a detachable device 220 (FIG. 16) configured to detachably couple the second movable part 152 and the clamping member 194 with each other.

As described above, in this embodiment, the bracket 144 and the clamping member 190, the first movable part 150 and the clamping member 192, and the second movable part 152 and the clamping member 194 are respectively attached to and detached from each other, by the detachable devices 216, 218, and 220.

Accordingly, tooling change for the workpiece clamping device 140 can be carried out only by changing the clamping members 190, 192, and 194. Therefore, it is possible to easily carry out the tooling change of the clamping members in response to the type of a workpiece to be processed.

Further, in this embodiment, the detachable devices 216, 218, and 220 are respectively comprised of the coupling shafts 147, 163, and 179 and the holes 196, 204, and 210 slidably receiving the coupling shafts 147, 163, and 179.

According to this configuration, it is possible to attach and detach the clamping member 190 to and from the bracket 144, and attach and detach the clamping members 192, 194 to and from the movable parts 150, 152, in the predetermined directions. Due to this, the clamping members 190, 192, and 194 can be respectively attached to and detached from the brackets 144, movable parts 150 and 152 by the robot 16.

Therefore, since the clamping members 190, 192, 194 can be automatically changed by the robot 16 in response to the type of a workpiece to be processed, it is possible to carry out the tooling change of the clamping members 190, 192, 194 in an easy and cost-effective manner.

Figure 24:
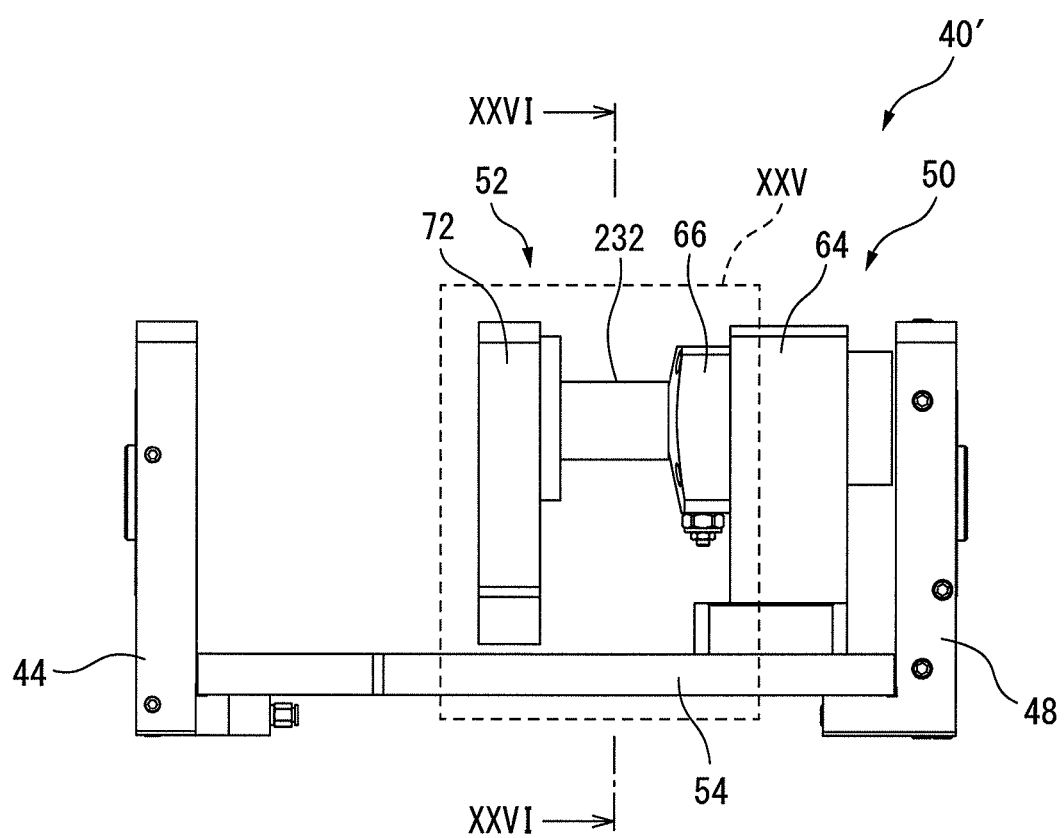
FIG. 24 is a view of a workpiece clamping device according to still another embodiment.
Figure 25:
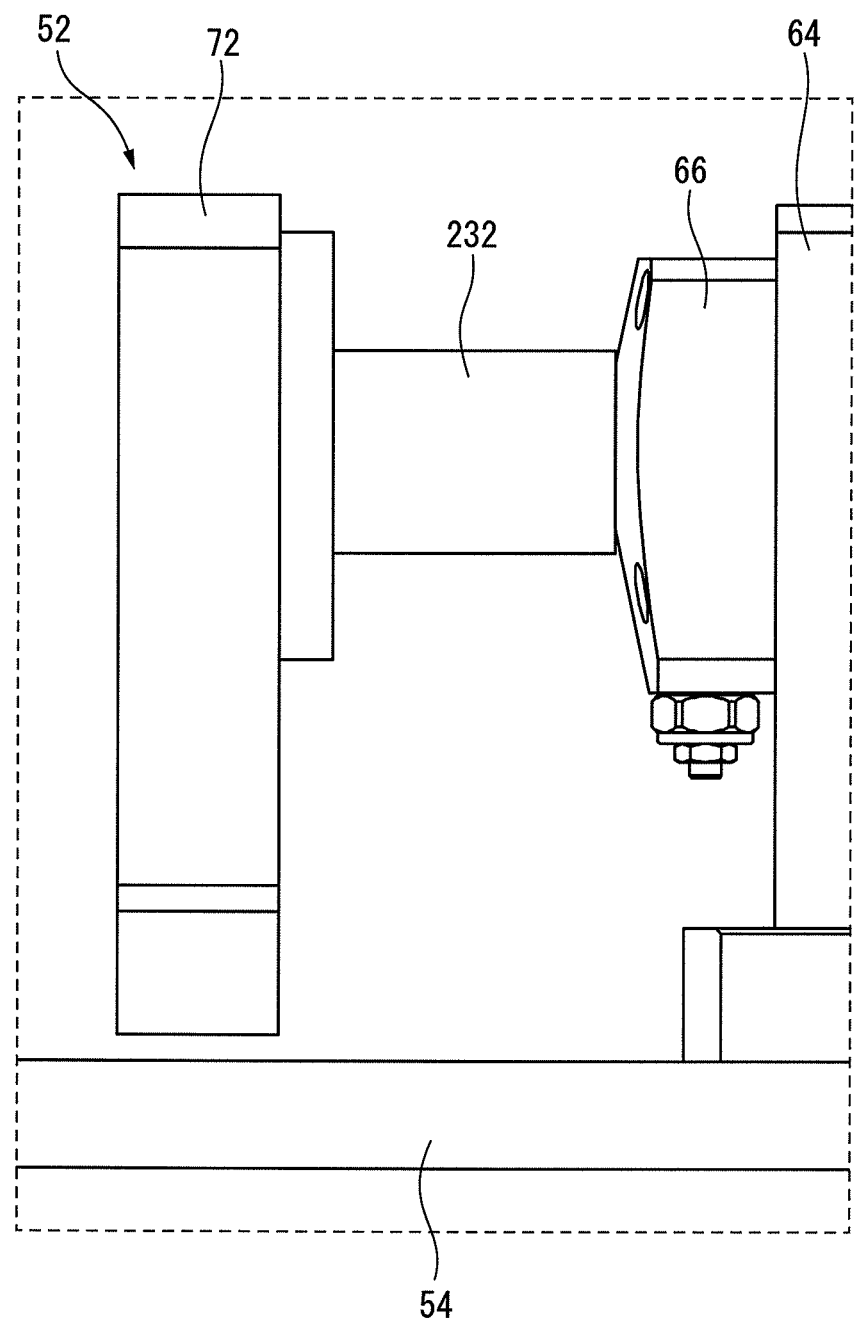
FIG. 25 is an enlarged view of region XXV in FIG. 24.

Next, with reference to FIGS. 24 to 26, a workpiece clamping device 40' according to another embodiment will be described. Note that, in the following embodiment, elements similar to those of the already-mentioned embodiments are assigned the same reference numerals, and detailed descriptions thereof will be omitted.

The workpiece clamping device 40' is different from the workpiece clamping device 40 in that the workpiece clamping device 40' includes a spacer 232. The spacer 232 is arranged between the cylinder main body 66 and the side plate 72 of the movable part 52.

Figure 26:
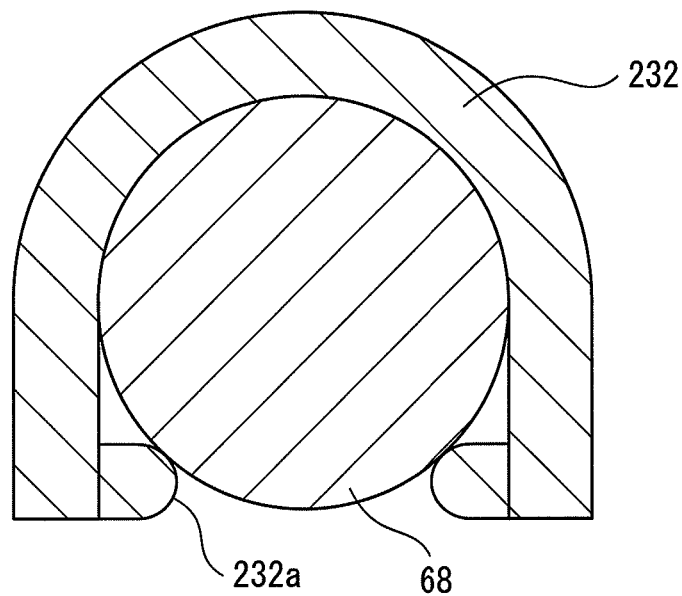
FIG. 26 is a cross-sectional view cut along XXVI-XXVI in FIG. 24.

As shown in FIG. 26, the spacer 232 is a member having a U-shaped cross-section, and includes an opening 232a. The spacer 232 is fitted over the outer periphery of the cylinder shaft 68. The spacer 232 can be fitted over the outer periphery of the cylinder shaft 68 by inserting the cylinder shaft 68 into the spacer 232 through the opening 232a.

By using the spacer 232, the right end of the movement stroke of the side plate 72 in the right-left direction can be set at a position separated leftward from the cylinder main body 66 by a distance corresponding to the width of the spacer 232 in the right-left direction.

Due to this, if a workpiece having a small width in the right-left direction is clamped, the movement stroke of the cylinder shaft 68 can be reduced. Therefore, it is possible to quickly carry out workpiece clamping operation.

Figure 27:
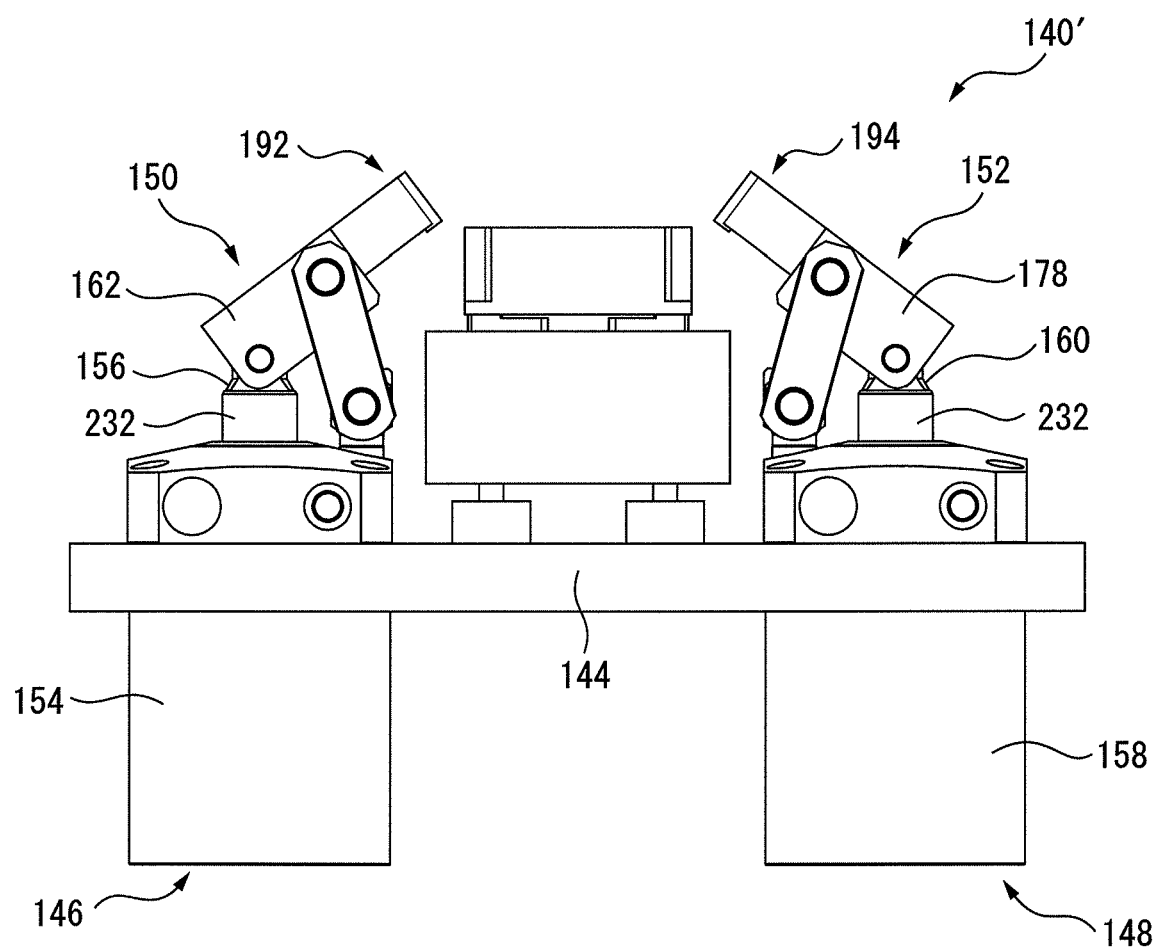
FIG. 27 is a workpiece clamping device according to still another embodiment.

Note that, such spacer 232 can be applied to the workpiece clamping device 140 shown in FIG. 11. A workpiece clamping device 140' having spacers 232 is shown in FIG. 27.

The workpiece clamping device 140' includes a first spacer 232, which is fitted over the outer periphery of the cylinder shaft 156 between the main arm 162 of the first movable part 150 and the cylinder main body 154, and a second spacer 232, which is fitted over the outer periphery of the cylinder shaft 160 between the main arm 178 of the second movable part 152 and the cylinder main body 158.

The spacers 232 can reduce the movement stroke of the cylinder shafts 156 and 160, and therefore, if a relatively small workpiece is clamped, it is possible to quickly carry out workpiece clamping operation.

The aforementioned spacer 232 can be fitted by the robot 16 or 116. As an example, in response to the information of the type of the clamping member specified at step S2 in FIG. 7 or step S22 in FIG. 19, the robot controller 18 or 118 determines whether the spacer 232 should be fitted.

When it is determined that the spacer 232 should be fitted, the robot hand 22 or 122 grips the spacer 232, and fits the spacer 232 over the outer periphery of the cylinder shaft 68, 156, or 160.

Note that, in the embodiment shown in FIGS. 1 and 2, the coupling shafts 60 may be formed on the first clamping member 80, and the holes 88 may be formed in the bracket 46. Likewise, the coupling shafts 76 may be formed on the second clamping member 82, and the holes 98 may be formed in the side plate 72.

In the embodiment shown in FIGS. 11 and 12, the coupling shafts 147 may be formed on the clamping member 190, the holes 196 may be formed in the bracket 144. Likewise, the coupling shaft 163 may be formed on the clamping member 192, and the hole 204 may be formed in the main arm 162. Likewise, the coupling shaft 179 may be formed on the clamping member 194, and the hole 210 may be formed in the main arm 178.

Any configuration of the detachable device, in which a bracket or a movable part can be detachably coupled to a clamping member, can be adopted. The detachable device may be comprised of, e.g., a claw-like hook and a portion to be hooked by the hook.

The drive part 50, 146, or 148 may be comprised of a motor and a motion conversion mechanism (e.g., ball screw mechanism) for converting rotational motion of the motor to reciprocal motion.

Although the invention has been described above through various embodiments, the embodiments do not limit the inventions according to the claims. Further, a configuration obtained by combining the features described in the embodiments of the invention can be included in the technical scope of the invention. However, all combinations of these features are not necessarily essential for solving means of the invention. Furthermore, it is obvious for a person skilled in the art that various modifications or improvements can be applied to the embodiments.

Regarding the order of operations, such as an actions, sequences, steps, processes, and stages, in the devices, systems, programs, and methods indicated in the claims, specification and drawings, it should be noted that the terms "before", "prior to", etc. are not explicitly described, and any order can be realized unless the output of a previous operation is used in the subsequent operation. Regarding the processing in the claims, specification, and drawings, even when the order of operations is described using the terms "first", "next", "subsequently", etc., for convenience, maintaining this order is not necessarily essential for working the inventions.

The invention claimed is:

1. A processing system comprising:
   a robot including a robot hand having openable and closable fingers;
   a robot controller configured to control the robot; and
   a workpiece clamping device comprising:
   a bracket;

a movable part provided movable in a first direction with respect to the bracket;

a clamping member detachably attached to the bracket or the movable part so as to clamp a workpiece, the clamping member including holes configured to engage the fingers respectively; and a detachable device configured to detachably connect the bracket or the movable part and the clamping member to each other, wherein the detachable device includes:

a coupling shaft provided at one of the bracket or the movable part and the clamping member so as to project out therefrom in the first direction;

a hole formed at the other of the bracket or the movable part and the clamping member so as to receive the coupling shaft slidably in the first direction; and a claw provided at the coupling shaft so as to be movable between:

a projection position at which the claw project out from the coupling shaft so as to engage a surface defining the hole; and a retraction position at which the claw retracts inward of the coupling shaft, wherein the robot controller is configured to control the robot so as to:

arrange the robot hand such that the clamping member stored in a predetermined place is disposed between the opened fingers;

close the fingers to engage the fingers with the respective holes, thereby gripping the clamping member with the robot hand;

move the clamping member gripped by the robot hand so as to dispose the clamping member between the bracket and the movable part; and when the clamping member is held between the bracket and the movable part and the detachable device connects the bracket or the movable part with the clamping member, open the fingers to release the clamping member from the robot hand, and retract the robot hand from the clamping member.

2. The workpiece clamping device according to claim 1, further comprising:

a drive part configured to drive the movable part, and including a cylinder shaft coupled to the movable part, and a cylinder main body configured to receive the cylinder shaft to be able to advance and retract; and a spacer configured to be fitted over the outer periphery of the cylinder shaft between the cylinder main body and the movable part.

3. A processing system comprising:

the workpiece clamping device according to claim 1; and a robot including a robot hand able to grip the clamping member, the robot gripping the clamping member by the robot hand so as to attach and detach the clamping member to and from the bracket or the movable part.

4. The workpiece clamping device according to claim 1, wherein the detachable device includes an automatically-controllable biasing part provided inside of the coupling shaft, and configured to bias the claw to move between the projection position and the retraction position in accordance with a command from a controller.

5. The workpiece clamping device according to claim 1, wherein the one of the bracket and the clamping member include:

an end face facing the other of the bracket and the clamping member; and a boss projecting from the end face toward the other of the bracket and the clamping member, wherein the coupling shaft is fixedly provided at the boss so as to project from the boss toward the other of the bracket and the clamping member.

6. The workpiece clamping device according to claim 1, wherein the hole is defined by a wall surface surrounding an outer peripheral surface of the coupling shaft.

7. The workpiece clamping device according to claim 1, wherein the claw includes a pair of claws provided at opposite positions about the coupling shaft.

* * * * *